United States Patent
Hala et al.

(10) Patent No.: US 9,641,647 B2
(45) Date of Patent: *May 2, 2017

(54) COMMUNICATION PROTOCOL AND SYSTEM FOR NETWORK COMMUNICATIONS

(71) Applicant: Intermec IP Corp., Fort Mill, SC (US)

(72) Inventors: Jaroslav Hala, Prague (CZ); Petr Franek, Prague (CZ)

(73) Assignee: Intermec IP Corp., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,558

(22) Filed: Feb. 19, 2016

(65) Prior Publication Data

US 2016/0173650 A1 Jun. 16, 2016

Related U.S. Application Data

(63) Continuation of application No. 13/494,978, filed on Jun. 12, 2012, now Pat. No. 9,270,782.

(51) Int. Cl.
*G06F 15/16* (2006.01)
*H04L 29/06* (2006.01)
*H04L 29/08* (2006.01)

(52) U.S. Cl.
CPC .............. *H04L 67/42* (2013.01); *H04L 67/14* (2013.01); *H04L 67/34* (2013.01)

(58) Field of Classification Search
CPC ......... H04L 67/00; H04L 67/10; H04L 67/14; H04L 67/34

USPC ......... 709/202–203, 220, 223–224, 227–228
See application file for complete search history.

(56) References Cited

U.S. PATENT DOCUMENTS

| | | |
|---|---|---|
| 5,537,468 A | 7/1996 | Harmann |
| 6,963,925 B1 * | 11/2005 | Ishikawa ............. H04L 12/2805 709/227 |
| 8,711,693 B2 | 4/2014 | Deepak |
| 9,270,782 B2 * | 2/2016 | Hala ...................... H04L 67/34 |
| 2001/0012777 A1 | 8/2001 | Igarashi et al. |
| 2002/0157024 A1 | 10/2002 | Yokote |
| 2003/0236827 A1 | 12/2003 | Patel et al. |
| 2004/0240408 A1 | 12/2004 | Gur |
| 2008/0132257 A1 | 6/2008 | Fok et al. |
| 2013/0086265 A1 | 4/2013 | Bao et al. |
| 2013/0090139 A1 | 4/2013 | McHenry et al. |
| 2013/0332524 A1 | 12/2013 | Fiala et al. |
| 2013/0332996 A1 | 12/2013 | Fiala et al. |

* cited by examiner

*Primary Examiner* — Bharat N Barot
(74) *Attorney, Agent, or Firm* — Additon, Higgins & Pendleton, P.A.

(57) ABSTRACT

A communication protocol and system is disclosed for network communications between a data service residing on a client that provides network communications between one or more mobile applications on a mobile computing device and a network based on a process number. The shared data service communicates with a data service plug-in on the server side associated with the process number, in order to handle requests from the mobile applications that access a plug-in associated with the process number through the data service. The communication connection between the mobile application and the data plug may be managed by a set of rules defined for that network communication.

20 Claims, 23 Drawing Sheets

FIG. 21

COMMUNICATION PROTOCOL AND SYSTEM FOR NETWORK COMMUNICATIONS

CROSS REFERENCE TO RELATED APPLICATIONS

The present application claims the benefit of U.S. patent application Ser. No. 13/494,978 for a System and Method for Managing Network Communications Between Server Plug-Ins and Clients filed on Jun. 12, 2012 (and published Dec. 12, 2013 as U.S. Patent Publication No. 2013/0332511), now U.S. Pat. No. 9,270,782. The present application is related to U.S. patent application Ser. No. 13/494,969 for Data Service on a Mobile Device filed on Jun. 12, 2012 (and published Dec. 12, 2013 as U.S. Patent Publication No. 2013/0332524). The present application is also related to U.S. patent application Ser. No. 13/494,983 for a System and Process for Managing Network Communications filed on Jun. 12, 2012 (and published Dec. 12, 2013 as U.S. Patent Publication No. 2013/0332996). Each of the foregoing patent applications, patent publications, and patent is hereby incorporated by reference in its entirety.

TECHNICAL FIELD

The present disclosure relates to communication protocols and systems and more particularly communication protocols and systems for assigning network communications between business applications on a mobile computing device and a network.

BACKGROUND

Mobile computing systems are used daily, in a wide range of industries, with applications such as route accounting, pre-sales, field services, parcel delivery, medical services, retail, warehousing, public safety and public services. To tailor a mobile computing device used in a mobile computing system to a particular industry application, the mobile computing device is typically provided with one or more business applications that configure the mobile computing device for that particular industry application use. For example, a mobile computing device, such as a scanning device, may be provided with a business application for managing inventory. This business application will generally set the settings of the scanner to the settings required to satisfy the communication needs of the business application, such as sending and receiving data to and from the business application. With the scanner so configured, the business application will then be able to recognize and store inventory data captured by the scanner into data files and to manipulate and communicate that data to a network to allow the user to manage the inventory at, for example, a warehouse.

Each of these business applications is generally designed to meet the special needs of that industry's mobile workforce, and as a result, these applications have different functionality which leads to different data structures, dataflow, work-flow, user interfaces, and supported peripherals. Conventional business applications may manage communications with the network directly in which case the business application will handle details of the communication itself. For example, it will typically open a network connection with a host server, such as a web server, and interact directly with the host system through whatever interface it exposes to address commands to the server, receive results, etc. Alternatively, business applications may use an application program interface (API) to assist in that management that allows them to access the network using a set of pre-defined functions that are part of the API. A business application that uses the API to handle communications over the network will typically manage details of the network communication itself, using the API. For example, the API will assist the business application in opening a network connection with a host server, such as a web server, and interact directly with the host system through whatever interface it exposes to address commands to the server and/or server-plug-in, receive results, etc. In either case, all of this requires that the designer of business applications have a thorough understanding of all of the details of the network, network protocols, servers, etc., and, in the case of the business application that uses the API, have a thorough understanding of the API as well. This can be a considerable burden for the developers of business applications with typical communication needs.

The requirement that a business application typically manage details of the network communication itself, alone or using the API, makes it difficult to scale the mobile computing system since diverse business applications have different network communication requirements. This requirement that a business application typically manages details of the network communication itself, alone or using the API, also leads to segmentation of the business applications at the network communication level; making it harder for the administrator to manage the rules that govern the network communications. It is harder to manage communications because typically each mobile application would independently, only for its own use, establish a communications session, through any network that was available, to any host system and the administrator has no way to monitor or manage what mobile applications are communicating from the device, with what server side resources, what data is being requested and submitted between the device/application and host system, who was the device user associated with the data exchange, how long the session took, through what network it's being executed, etc. It also makes the network less open and less extendible to meet the specific needs of each organization since some business applications may not be configurable for use with or it may be difficult to configure the business application for use with the network which may mean that a business application may not get used with a network. The requirement that a business application typically manages details of the network communication itself, alone or using the API, also means that each business application will have a separate communication link with the network which creates more channels of communication with the network. This means that there are more communication channels that the network needs to manage. It also means that there are more channels of communication that are open to a security breach.

There is a need for a mobile computing system in which any number of mobile business applications running on the same device (and running on any number of devices and device types) can exchange data in parallel with any number of host system resources. There is a need for a mobile computing system in which the details of the network communication between a business application residing on a mobile computing device and a network or host system are made more uniform. There is a need for a unified approach to implementing connectivity between mobile applications and host systems that improves mobile communication flexibility and reliability and management, enhances data transmission security, enables better mobile device management and mobile application support, enables extensive control over mobile data exchange transactions, enables mobile computing devices to be more quickly and efficiently used on the network, provides an integrated and yet highly scalable solution, and enables comprehensive monitoring of all communications and data processing. This disclosure addresses those needs.

SUMMARY OF THE INVENTION

A communication protocol and system is disclosed for assigning network communications between a data service residing on a client that provides network communications between a plurality of mobile applications on a source and a network for a process number. The data service is configured to accept commands from the plurality of mobile applications using a text-based mark-up language. The shared data service is a single instance of a process executing on the source, such as a mobile device, that handles the typical communication needs of business applications, such as sending and receiving data. The shared data service process takes care of details such as initiating network communications, opening a network connection to a gateway server, determining the server with which it will communicate, etc. Generally, the shared data service communicates with a data service plug-in on the server side, in order to handle requests from the business applications that access the network through the data service.

In some embodiments a system for managing communication over a network includes a plug-in detector to generate a control signal responsive to an instruction code of a variable-length instruction set. The instruction code includes a source address field, a destination address field, and a field for identifying a process number for configuring a data service residing on a client on a mobile computer that provides network communications between one or more mobile applications on the mobile computer and a network.

In some embodiments the process number of the system is associated with a set of one or more predetermined rules for establishing communications between the one or more mobile applications on a mobile computer and the network using the plug-in.

In some embodiments, the method for communicating a message over a network may include the steps of: providing a message having a source address field, a destination address field, and a field for identifying a process number for configuring a data service residing on a client on a mobile computer that provides network communications between one or more mobile applications on the mobile computer and a network. In another embodiment, a data service field is provided for identifying whether the client is executing a single instance of a data service that provides network communications between a plurality of business applications on the mobile computer and a server.

In another embodiment, the process number identifies a plug-in to manage a data communication between the one or more mobile applications on the mobile computer and the plug-in. In another embodiment, the management of the communication between the one or more mobile applications on the mobile computer and the network by the plug-in includes interpreting the data received from the one or more mobile applications on the mobile computer. In another embodiment, the management of said communication between the one or more mobile applications on the mobile computer and the network by said plug-in includes retrieving new data from the network and handing said data back to a server for deliver back to said one or more mobile applications.

In another embodiment, the method further includes the step of associating with the process number a set of one or more predetermined rules for establishing communications between the one or more mobile applications on a mobile computer and the network using the plug-in. In another embodiment, the method further includes the step of defining the set of one or more predetermined rules for establishing communications between the one or more mobile applications on a mobile computer and the network using the plug-in is by a network manager. In another embodiment, the method further includes the step of downloading the set of one or more predetermined rules for establishing communications between the one or more mobile applications on a mobile computer and the network using the plug-in to the client on the mobile computer at the start of a communication between the one or more mobile applications on the mobile computer and the network. In another embodiment, the one or more mobile applications support data transfers of business or personal data.

In another embodiment, the rules associated with the process number identified in the process number field of the provided message includes a set of rules for configuring the data service to establish a connection between the one or more mobile applications on the client on the mobile computer and the network based upon the set of rules. The set of rules may include settings for the configuring of the data service to establish the connection between the one or more mobile applications on the client on the mobile computer and the network based upon the set of rules. The set of rules may include updates to the data service that provides network communications between the one or more mobile applications on the mobile computer and the network. The set of rules may define a priority between a plurality of communication protocols. The data service may be configured to use a one of the plurality of communication protocols available to the mobile computer according to the priority defined by the set of rules included in the rules associated with the process number downloaded to the client on the mobile computer for use with the business application on the mobile, In another embodiment, the set of rules may define a priority between a plurality of periods of time available to the mobile computer according to the priority defined by the set of rules included in the rules associated with the process number downloaded to the client on the mobile computer for use with the one or more mobile application on the mobile, In another embodiment, a protocol and method for assigning network communications between one or more mobile applications on mobile computing device and a network may include the steps of: collecting data from plug-ins residing on servers and associated with process numbers for configuring a data service residing on a client on a mobile computer that provides network communications between one or more mobile applications on the mobile computer and a network. The plug-in data is stored in a database. Processing load data is collected from said servers using a gateway and stored in the database. The plug-in data is aggregated and correlated and stored in the database. A message is received from data service residing on a client on a mobile computer that provides network communications between one or more mobile applications on a source mobile computer and a network for a process number. The message identifies a process number for a plug-in to manage a data communication between the one or more mobile applications on the mobile computer and the plug-in. From said aggregated and correlated plug-in data is determined a one of said plurality of servers capable of managing said requested process and the requested process number from the data service residing on the client is assigned to the one of the servers capable of managing the requested process.

In another embodiment, a method for assigning network communications between one or more mobile applications on a mobile computing device and a network may include the steps of polling a plurality of servers using a gateway to collect data from plug-ins residing on servers and associated with process numbers for configuring a data service residing on a client on a mobile computer that provides communications between one or more applications on the mobile computer and the network. Any one or more of the polled plurality of servers that has not responded to the poll is detected and active fail-over is triggered to inactivate the one or more of the plurality of servers that has not responded to the poll. All subsequent messages from a data service residing on a client and identifying a process number for a plug-in to manage a data communication between the one or more mobile applications on the mobile computer and the plug-in are redirected to one or more servers that has responded to said poll. On receiving notification from a one of the one or more of the servers that has not responded to the poll that the one of the one or more of said servers that has not responded to the poll is available for processing, the server that is available is reactivated for the collection of the plug-in data.

In another embodiment, a method for establishing network communications between one or more mobile applications on a mobile computing device and a server may include the steps of receiving a message from a data service residing on a client on a mobile computing device at a gateway to initiate a network communication between a mobile application on a mobile computing device and the gateway for a plug-in to manage a data communication between the mobile application on the mobile computer and the plug-in. A communication session between the data service and the gateway is established. A message from the data service residing on the client requesting a process number at the gateway for the plug-in to manage a data communication between the mobile application on the mobile computer and the plug-in is received. The requested process number is assigned to a server capable of managing the requested process. A connection path is formed between the plug-in and the mobile application, the plug-in managing the data communication between the mobile application on the mobile computer and the plug-in.

In another embodiment, a method for establishing network communications between a mobile application on a mobile computing device and a server may include the steps of: determining the type of network connections available for a mobile computing device in a network and determining the type of network connections permitted by a set of rules contained in a database residing on one or more servers and associated with a process number for configuring a data service residing on a client on the mobile computing device for providing network communications between the mobile application on the mobile computing device and a plug-in associated with the process number. The priority of each of the permitted network connections may be determined based upon the set of rules contained in the database. The time of day during which each type of network connection is available for connection may be determined based upon the set of rules contained in the database. The network connection types and the times of day each type of network connection is available for connection permitted by the process associated with the plug-in may be stored in a database. A message is received from a data service residing on a client that provides network communications between a mobile application on a mobile computing device and a network for a process number for a plug-in to manage a data communication between the mobile application on a mobile computing device and a plug-in. The mobile application may be connected with the plug-in for managing a data communication between the mobile application on the mobile computer and the plug-in based on the set of rules that are contained in the database for the requested process number.

In another embodiment, a method for establishing network communications between a mobile application on a mobile computer and a network may include the steps of: receiving a message from a data service residing on a client on a mobile computer that provides network communications between a mobile application on the mobile computer and a network for a process number for a plug-in to manage a data communication between the mobile application on the mobile computer and the plug-in. A determination is made if a connection to a server has already been established between the data service residing on the client and the network. A new network connection is established between the data service residing on the client and the network for the plug-in if the connection to the server has not already been established. A determination is made as to a connection already established between the data service residing on the client and the network if the already established connection is of the kind that may be used with the requested process number. A new network connection between the data service residing on the client and the network is established if the already established communication is not of the kind that may be used with the requested process number. A second communication session is created within the already established connection containing a first communication session for simultaneous processing both the first communication session and the second communication session in the already established connection if the already established connection is of the kind that may be used with the first process number.

In another embodiment of a method, a plug-in for use in establishing network communications between a plurality of mobile applications on a mobile computing device and a network may include a plug-in residing on one or more servers on a network and associated with a process number for configuring a data service residing on a client on a mobile computing device that provides network communications between one or more mobile applications on the mobile computing device and the network; and a database of one or more predetermined rules for establishing network communications between one or more mobile applications on a mobile computing device and the plug-in, the predetermined rules including a set of data on the properties of a set of one or more mobile computers within a network that are permitted to use the plug-in within the network, and a set of data on the priorities that each mobile computer of the set of one or more mobile computers that are permitted to use the plug-in is to follow when establishing network communication between one or more mobile applications on each mobile computer of the set of one or more mobile computers and the network. The set of data on the priorities that each mobile computer of the set of one or more mobile computers that are permitted to use the plug-in is to follow when establishing network communication between of the one or more mobile applications and the network may include a first set of one or more devices associated with one or more computers of the set of mobile computers that are permitted to use the plug-in having a primary priority and a second set of one or more devices associated with one or more of the set of one or more mobile computers that are permitted to use the plug-in having a secondary priority. The second set of the one or more devices associated with the one or more mobile computers of the set of mobile computers that are permitted to use the plug-in having a secondary priority may be taken from the group consisting of a printer, a scanner, and a facsimile device. The second set of data associated with the one or more mobile computers of the set of mobile computers that are permitted to use the plug-in may include a time zone associated with the each one of the set of mobile computers. The second set of data associated with the each one or more mobile computers of the set of one or more mobile computers that are permitted to use the plug-in may include a rule regarding whether the one or more of the set of one or more mobile computers that are permitted to use the plug-in is required to use a different plug-in when the each one of the set of mobile computers is in a different time zone. The set of device properties of the second set of the one or more devices may include data indicating whether a one of the set of the one or more devices is a shared or individual resource.

Other embodiments are also disclosed.

BRIEF DESCRIPTION OF THE DRAWINGS

FIG. 10 shows an embodiment of connection path scenarios for an illustrative set of rules that have been defined for a plug-in and useable by a client requested the process number for that plug-in.

FIG. 21 shows an embodiment of a window that may appear on a display of a mobile computer illustrating the management by a system manager of communications between mobile devices and host systems by connection paths according to the present invention.

DETAILED DESCRIPTION

Figure 1:
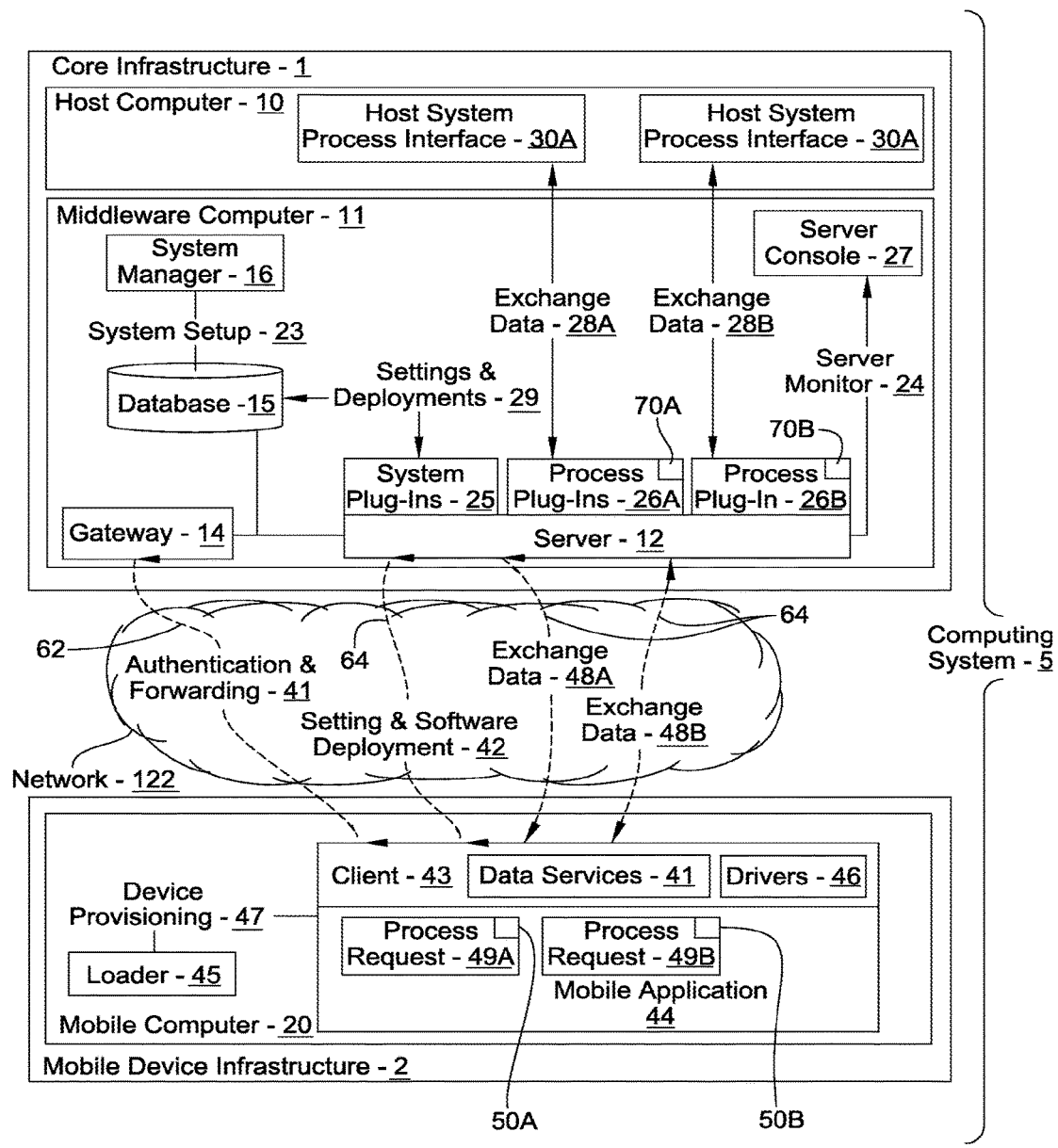
FIG. 1 shows an illustrative embodiment of a block diagram of a computing system according to the present disclosure.

A communication protocol and system is disclosed for network communications between a data service residing on a client that provides network communications between a plurality of mobile applications on a source and a network for a process number. The data service is configured to accept commands from the plurality of mobile applications using a text-based mark-up language. The shared data service may be a single instance of a process executing on the source, such as a mobile device, that handles the typical communication needs of business applications, such as sending and receiving data. The shared data service process takes care of details such as initiating network communications, opening a network connection to a gateway server, determining the server with which it will communicate, etc. Generally, the shared data service communicates with a data service plug-in on the server side associated with the process number, in order to handle requests from the business applications that access the network through the data service. The particulars of the data service residing on the client for use with the disclosed protocol and its architecture and manner of operation in providing network communications between a plurality of mobile applications on a source and a network for a process number can be found in application entitled "Data Service on a Mobile Device" filed contemporaneously herewith and is incorporated herein by reference. The particulars of the system for use with the disclosed protocol and its architecture and manner of operation in allowing for network management of a plurality of mobile applications on a source by a process number can be found in application entitled "System and Process for Managing Network Communications" filed contemporaneously herewith and is incorporated herein by reference.

In some embodiments a system for managing communication over a network includes a plug-in detector to generate a control signal responsive to an instruction code of a variable-length instruction set. The instruction code includes a source address field, a destination address field, and a field for identifying a process number for configuring a data service residing on a client on a mobile computer that provides network communications between one or more mobile applications on the mobile computer and a network.

In some embodiments the process number of the system is associated with a set of one or more predetermined rules for establishing communications between the one or more mobile applications on a mobile computer and the network using the plug-in In some embodiments, the method for communicating a message over a network comprises the steps of: providing a message having a source address field, a destination address field, and a field for identifying a process number for configuring a data service residing on a client on a mobile computer that provides network communications between one or more mobile applications on the mobile computer and a network. In another embodiment, a data service field is provided for identifying whether the client is executing am instance of a data service that provides network communications between a plurality of business applications on the mobile computer and a server.

In another embodiment, the process number identifies a plug-in to manage a data communication between the one or more mobile applications on the mobile computer and the plug-in. In another embodiment, the management of the communication between the one or more mobile applications on the mobile computer and the network by the plug-in includes interpreting the data received from the one or more mobile applications on the mobile computer. In another embodiment, the management of said communication between the one or more mobile applications on the mobile computer and the network by said plug-in includes retrieving new data from the network and handing said data back to a server for deliver back to said one or more mobile applications.

In another embodiment, the method further includes the step of associating with the process number a set of one or more predetermined rules for establishing communications between the one or more mobile applications on a mobile computer and the network using the plug-in. In another embodiment, the method further includes the step of defining the set of one or more predetermined rules for establishing communications between the one or more mobile applications on a mobile computer and the network using the plug-in is by a network manager. In another embodiment, the method further includes the step of downloading the set of one or more predetermined rules for establishing communications between the one or more mobile applications on a mobile computer and the network using the plug-in to the client on the mobile computer at the start of a communication between the one or more mobile applications on the mobile computer and the network. In another embodiment, the one or more mobile applications support data transfers of business or personal data.

In another embodiment, the rules associated with the process number identified in the process number field of the provided message includes a set of rules for configuring the data service to establish a connection between the one or more mobile applications on the client on the mobile computer and the network based upon the set of rules.

In another embodiment, the set of rules include settings for the configuring of the data service to establish the connection between the one or more mobile applications on the client on the mobile computer and the network based upon the set of rules.

In another embodiment, the set of rules include updates to the data service that provides network communications between the one or more mobile applications on the mobile computer and the server.

In another embodiment, the set of rules defines a priority between a plurality of communication protocols. The data service is configured to use a one of the plurality of communication protocols available to the mobile computer according to the priority defined by the set of rules included in the rules associated with the process number downloaded to the client on the mobile computer for use with the business application on the mobile, In another method, the set of rules defines a priority between a plurality of periods of time available to the mobile computer according to the priority defined by the set of rules included in the rules associated with the process number downloaded to the client on the mobile computer for use with the one or more mobile application on the mobile, In another embodiment, a method for assigning network communications between one or more mobile applications on mobile computing device and a network comprises the steps of: collecting data from plug-ins residing on servers and associated with process numbers for configuring a data service residing on a client on a mobile computer that provides network communications between a plurality of business applications on the mobile computer and a server. The plug-in data is stored in a database. Processing load data is collected from said servers using a gateway and stored in the database. The plug-in data is aggregated and correlated and stored in the database. A message received from data service residing on a client on a mobile computer that provides network communications between one or more mobile applications on a source mobile computer and a network for a process number. The message identifies a process number for a plug-in to manage a data communication between the one or more mobile applications on the mobile computer and the plug-in. From said aggregated and correlated plug-in data is determined a one of said plurality of servers capable of managing said requested process and the requested process number from the data service residing on the client is assigned to the one of the servers capable of managing the requested process.

In another embodiment, a method for assigning network communications between one or more mobile applications on a mobile computing device and a network comprises the steps of polling a plurality of servers using a gateway to collect data from plug-ins residing on servers and associated with process numbers for configuring a data service residing on a client on a mobile computer that provides communications between one or more applications on the mobile computer and a network. Any one or more of the polled plurality of servers that has not responded to the poll is detected and active fail-over is triggered to inactivate the one or more of the plurality of servers that has not responded to the poll. All subsequent messages from a data service residing on a client and identifying a process number for plug-in to manage a data communication between the one or more mobile applications on the mobile computer and the plug-in are redirected to one or more servers that has responded to said poll. On receiving notification from a one of the one or more of the servers that has not responded to the poll that the one of the one or more of said servers that has not responded to the poll is available for processing, the server that is available is reactivated for the collection of the plug-in data.

In another embodiment, a method for establishing network communications between one or more mobile applications on a mobile computing device and a server comprises the steps of: receiving a message from a data service residing on a client on a mobile computing device at a gateway to initiate a network communication between a mobile application on a mobile computing device and the gateway for a plug-in to manage a data communication between the mobile application on the mobile computer and the plug-in. A communication session between the data service and the gateway is established. A message from the data service residing on the client requesting a process number at the gateway is received. The requested process number is assigned to a server capable of managing the requested process. A connection path is formed between the plug-in and mobile application, the plug-in managing the data communication between the mobile application on the mobile computer and the plug-in.

In another embodiment, a method for establishing network communications between one or more mobile applications on a mobile computing device and a server comprises the steps of: determining the type of network connections available for a mobile computing device in a network and determining the type of network connections permitted by a set of rules contained in a database residing on one or more servers and associated with a process number for configuring a data service residing on a client on the mobile computing device for providing network communications between one or more applications on the mobile computing device and a plug-in associated with the process number. The priority of each of the permitted network connections is determined based upon the set of rules contained in the database. The time of day during which each type of network connection is available for connection is determined based upon the set of rules contained in the database. The network connection types and the times of day each type of network connection is available for connection permitted by the process associated with the plug-is stored in a database. A message is received from a data service residing on a client that provides network communications between a mobile application on a mobile computing device and a network for a process number for a plug-in to manage a data communication between the mobile application on a mobile computing device and a plug-in. The mobile application is connected with the plug-in for managing a data communication between the mobile application on the mobile computer and the plug-in based on the set of rules that are contained on the database for the requested process number.

In another embodiment, a method for establishing network communications between a mobile application on a mobile computer and a network comprises the steps of: receiving a message from a data service residing on a client on a mobile computer that provides network communications between a mobile application on the mobile computer and a network for a process number for a plug-in to manage a data communication between the mobile application on the mobile computer and the plug-in. A determination is made if a connection to a server has already been established between the data service residing on the client and the network. A new network connection is established between the data service residing on the client and the network for plug-in if the connection to the server has not already been established. A determination is made as to a connection already established between the data service residing on the client and the network if the already established connection is of the kind that may be used with the requested process number. A new network connection between the data service residing on the client and the network is established if the already established communication is not of the kind that may be used with the requested process number. A second communication session is created within the already established connection containing a first communication session for simultaneous processing both the first communication session and the second communication session in the already established connection if the already established connection is of the kind that may be used with the first process number In another embodiment, a plug-in residing on one or more servers on a network and associated with a process number for configuring a data service residing on a client on a mobile computing device that provides network communications between one or more mobile applications on the mobile computing device and the network; and a database of one or more predetermined rules for establishing network communications between one or more mobile applications on a mobile computing device and the plug-in, the predetermined rules including a set of data on the properties of a set of one or more mobile computers within a network that are permitted to use the plug-in within the network, and a set of data on the priorities that each mobile computer of the set of one or more mobile computers that are permitted to use the plug-in is to follow when establishing network communication between one or more mobile applications on each mobile computer of the set of one or more mobile computers and the network. In another embodiment, a set of data on the properties each mobile computer of the set of one or more mobile computers within a network that are permitted to use the plug-in within the network includes an IP address of each mobile computer of the set of the one or more mobile computers within a network that are permitted to use the plug-in within the network.

In another embodiment, the set of data on the priorities that each mobile computer of the set of one or more mobile computers that are permitted to use the plug-in is to follow when establishing network communication between the one or more mobile applications and the network includes a first set of one or more devices associated with one or more of the one of the set of mobile computers that are permitted to use the plug-in having a primary priority and a second set of one or more devices associated with one or more mobile computers of the set of mobile computers that are permitted to use the plug-in having a secondary priority.

In another embodiment, the second set of one or more devices associated with the one or more mobile computers of the set of mobile computers that are permitted to use the plug-in having a secondary priority is taken from the group consisting of a printer, a scanner, and a facsimile device.

In another embodiment, a set of device properties of the first set of one or more devices associated with one or more mobile computers of the set of mobile computers that are permitted to use the plug-in having a primary priority is taken from the group consisting of a form of communication, a modem, a connection name, a password, an IP address, and one or more properties.

In another embodiment, the second set of data associated with the one or more mobile computers of the set of mobile computers that are permitted to use the plug-in includes a time zone associated with the each one of the set of mobile computers.

In another embodiment, the second set of data associated with the one or more mobile computers of the set of mobile computers that are permitted to use the plug-in further includes a rule regarding whether the each one of the set of mobile computers that are permitted to use the plug-in is required to use a different plug-in when the each one of the set of mobile computers is in a different time zone.

In another embodiment, the set of device properties of the second set of one or more devices includes data indicating whether a one of the set of one or more devices is a shared or individual resource.

Before turning to a description of the protocol, a general discussion of the overall system is provided as background.

As discussed herein, the term "computing system" generally makes reference to computers (and other components, as appropriate) equipped with functionality (e.g., appropriate software) for implementing the teachings disclosed herein.

Referring now to FIG. 1, there is shown a configuration of a computing system 5. In this embodiment, the computing system 5 includes a core infrastructure 1. The core infrastructure 1 includes at least one host computer 10, and at least one middleware computer 11. The core infrastructure 1 is adapted for communicating with a mobile device infrastructure 2 through the network 122. Generally, the mobile device infrastructure 2 includes a plurality of mobile computers 20. Mobile computers may include but are not limited to hand held computers, tablet computers, notebook computers, PDA, smartphones, and any other portable computing device useful for participating in data exchanges with servers, networks, and other components of computing systems.

It should be recognized that unless otherwise specified, the computing system 5 may include more than one of any of the components introduced herein. For example, in a large enterprise, it may be appropriate to include a plurality of servers 12. Accordingly, unless it is not feasible to implement a plurality of any given component, one should recognize that a plurality may be implemented.

Turning to the middleware computer 11 in more detail, it may be seen that the middleware computer 11 supports a few different aspects of the computing system 5. For example, the middleware computer 11 includes a gateway 14, a database 15, a system manager 16, a server 12 and a server console 27. Each of these components will be discussed further herein. Generally, the middleware computer 11 communicates with each of the mobile computers 20 through the network 122, which is accessed through at least one of the gateway 14 and the server 12. The mobile computer 20, in turn, operates a client 43 for enabling the communications. The client 43 interfaces with at least one mobile application 44, such as a business application, on board the mobile computer 20. More specifically, the client 43 allows computer system 5 to process data transfer requests from enabled business applications, An introduction providing exemplary aspects of some of the components in the computing system 5 is now provided. In general, the gateway 14 is a server-side application that functions as an entry point into the computing system 5. The server 12 is a server-side application that accepts and handles requests 49 (49a, 49b) from a particular client 43. The server console 27 is a server-side application that provides a visual monitor of the communications processing within the computing system 5. A "remote-assist server" (not shown) is a server-side application that acts as a bridge between a remote assist console (not shown) and each client 43. The remote assist console may be a Microsoft Windows application (available from Microsoft Corporation of Redmond Wash.) that allows remote assist operators to collaboratively support users of the mobile device infrastructure 2. A "system monitor" is a server-side application that provides users with a visual indicator of the operating status of servers 12 and gateways 14 within a single implementation of the computing system 5. A process plug-in 26 (26a, 26b) is a server-side application that processes data exchanged for each request from a client 43. A system plug-in 25 is a special plug-in application that is used to perform system-level functions. A "test plug-in" (not shown) is an application that works with test client applications to verify connectivity and to test system performance for a given communications infrastructure. The system manager 16 is a server-side application that operates as a control center. A "packager" is a stand-alone application that provides for bundling files into packages.

The client 43 is a client-side application that provides for processing data transfer requests 49 from a mobile application 44. "Data services" 41 are a set of interfaces that provide mobile applications 44 with communications and data management functions as described in greater detail below and in application entitled "Data Services for Network Communications" filed contemporaneously herewith and is incorporated herein by reference. A device driver 46 is an application designed to work with a respective client 43 and control a specific type of mobile computer 20. A loader 45 is a client-side application used to register each mobile computer 20 with a specific computing system 5. The database 15 is a central structured repository that contains system configuration settings, such as settings that control how the computing system 5 operates. "SQL Server" is a separate application that handles requests from applications of the computing system 5 to access the database and retrieve or store information. SQL Server is a product of Microsoft Corporation of Redmond Wash. Also, in general, a "mobile business application" or simply a "mobile application" 44 is a software application that runs on a mobile computer 100 (also referred to as a "mobile device.") Now consider some of the foregoing and other components in more detail.

The Gateway 14. The gateway 14 is a server-side application that functions as an entry point into the computing system 5. This application may run as a service in the operating system of a server-side computer 100, so it does not require a user interface. Each client 43 that submits a request 49 to establish a connection and exchange data 48 in the computing system 5 first connects to the gateway 14 for authentication and forwarding 41. The gateway 14 may also be used to implement push messaging features. The gateways 14 provide the direct push capabilities needed to deliver messages to clients 43 running on targetted mobile computing devices 20 that are accessible within the computing system 5. Push messages are a feature of the computing system 5 that allows the host computer 10 to initiate on-demand communications with a mobile business application 44, as opposed to having to wait for the mobile business application 44 to connect to a server 12. Push messaging provides for greater responsiveness and faster business process execution in a mobile device infrastructure 2.

The Server 12. The server 12 is a server-side application that accepts and handles requests 49 from the client 43 that are redirected from the gateway 14. The server 12 runs as a service in the operating system of a server-side computer, and hence does not require a user interface. Each mobile device 20 requesting exchange data 48 within the computing system 5 provides a process identifier 50 with each request 49 (called a "process number"). The process number identifies a particular process plug-in 26*a*, 26*b* that is used to handle the request 49 on the server 12. Each request 49 is redirected by the gateway 14 to the server 12 together with an associated process number. The server 12 then uses the process number to determine an appropriate process plug-in 26*a*, 26*b* to be invoked, thereby allowing the bidirectional flow of business data between the server 12 and the client 43 on the mobile computing device 20.

The Server Console 27. The server console 27 is a server-side application that is generally installed on the same computer 100 as the server 12. Because the server 12 runs as a service on the operating system and does not require a user interface, the server console 27 application may be used to provide a view into the operation of the server 12. The server console 27 provides a near real-time, continuous, read-only visual monitor of the communications processing taking place on the server 12. The server console 27 application allows observation of handling of communications by the server 12 during daily operations. The server console 27 application also provides a detailed view into data being transmitted within each communication session and therefore may be useful when seeking to identify a source of any connection or data management problems. Each mobile computer 20 requesting to exchange data within system 5 must provide with each of its requests an identifier of the process called a "process number" (not shown). The process number identifies the Plug-In process 26 that is to be used to handle the request on the server 12. The Plug-in process is a server side application that processes the data that is exchanged between computing system 5 and each client.

The Remote Assist Server. The remote assist server is a server-side application that runs as a service in the operating system of a server-side computer 100. The remote assist server acts as a bridge between the remote assist console application and the client 43 running on a given mobile device 20. Remote assists sessions are driven and controlled through the remote assist server. To use remote assist features in the computing system 5, this service must be active.

For implementations of the computing system 5 which utilize more than one server 12, it may be useful to install the server console 27 on a remote computer 100 (such as the desktop computer of the mobile computing system administrator) and then register each server 12 to that server console 27 so there will be a single point for server monitoring 24.

The Remote Assist Console. The Remote Assist Console is a Microsoft Windows application that allows remote assist operators to collaboratively support users of the mobile communication system. Remote assist operators can, for example: remotely connect to and control multiple mobile devices 20; invite other operators to a remote assist session to collaborate and solve problems; initiate a connection to a mobile device 20 and remotely see and control a screen of the mobile device 20 without any interaction with the user; get and send files using standard Windows applications; record video or take screen shots of a remote assist session; as well as other similar tasks.

The System Monitor. The system monitor is a server-side application that provides a basic visual indicator of the operating status of servers 12 and gateways 14 within a single computing system 5. The system monitor application is generally installed on the same computer 100 as the system manager 16. However, the system monitor may be installed anywhere where a central monitoring dashboard for the computing system 5 is desired.

The Plug-In 26. The Plug-In application is designed to run on a server 12. Generally, the plug-in 26 is provided with a specific version of an enabled mobile business application 44. The system manager 16 loads Plug-In files into the computing system 5, which then stores these files and related information in the database 15. Based on the settings defined in the system manager 16, remote servers automatically extract Plug-In program files from the database 15 and install those files on a local computer 100. Each installed Plug-In program is then automatically called by the server 12 to process a specific request (identified by a unique process number) sent to it from a mobile business application 44.

The Plug-In 26 performs the processing of the business data that is exchanged for each request 49 from the client 43. Thus, the Plug-In 26 receives data associated with each request 49, processes the data in accordance with programmed business data processing logic and, in some embodiments, responds to the request 49. The processing performed by a Plug-In 26 is limited by, for example, needs of the developer, and resources in the computing system 5.

It is not required that each Plug-In 26 be dedicated to processing a single type of request 49. For example, the Plug-In 26 is not limited to processing requests 49 that are associated with only one process number. Thus, a single Plug-In 26 may support multiple process requests 49*a*, 49*b* (multiple types of requests from the mobile business application 44) with each process request 49 in the Plug-In 26 having its own unique process number. The extent to which process requests 49 to be handled are aggregated into a single Plug-In 26, or conversely the extent to which each Plug-In is atomized to handle only one specific process request 49, is discretionary.

It is not necessary that each Plug-In 26 run continuously on the server 12. Rather, a separate copy of the Plug-In 26 may be loaded into memory 250 and run each time the server 12 calls the Plug-In 26 to process a new request 49.

Essentially, the server 12 creates as many independent, virtual clones of a Plug-In 26 as is needed to manage all new incoming requests 49. The Plug-In 26 can exchange data 48 using any number of methods such as the transmission of a file, the direct manipulation of records in a database, interacting with a web service or parsing an XML document and executing a remote function call to a host system. Because the Plug-In 26 contains the intelligence to understand the data that is being passed to it, the Plug-In 26 can process the data in an event driven style, performing different tasks and starting and stopping different auxiliary systems based on the data and when it is received.

From the foregoing description, it is seen that the plug-in is a special program that is placed into memory by the server 12 when the server receives a request that a communications session be handled by that plug-in. The request illustratively calls for the plug-in by process number, a process name, or by some other form of identification. In addition, the process requested may be but one of a plurality of processes that may be encapsulated in a single plug-in. For example, a plug-in could be named "SAP Integration" and contain a first process, Process Number 1000, named "Submit New Order to SAP", and a second process, Process Number 1250, named "Retrieve Inventory Status for Part No." Each of these Plug-In Processes are essentially atomized chunks of business data processing and integration logic. As described herein, the system itself is agnostic to any business logic—it does not understand the data it transmits. However, a plug-in process, as mentioned above, can interpret the data sent to it, and for example, connect to an SAP ERP host system, use the data received from the mobile application to retrieve new data from SAP, and then hand that data back over to the server for delivery back to the mobile application/device (all within a couple of seconds). Note that the plug-in itself does not contain rules for routing the data etc. The way connections are established and data is routed, is a function of the way the client and the gateway/server communicate together, using their own protocol that is separate from the data being transferred and separate from the data services protocol.

As described above and further below, the plug-ins do not contains rules; that is to say, rules are not updated on plug-ins. Rather, the only thing that plug-in processes receive is input in the form of data that is routed to it through the system (through the client and server) from a mobile business application. A plug-in process can also reference the system code associated with the communication session to identify the user for whom the data exchange is being requested. In addition, the plug-in processes can also obtain as input the value of any plug-in properties that the administrator may have defined values for through the administrator application.

The System Plug-In 25. The System Plug-In 25 is a special type of application that is pre-installed with the server 12 and is used to perform system level functions. Exemplary system level functions include tasks such as deploying software packages to the mobile device 20 and remotely configuring the mobile device 20. The behavior of the system Plug-In 25 program is controlled by the configuration settings defined in the system manager application 16.

The Test Plug-In. The Test Plug-In program, available with each computing system 5, is designed to work together with Test Client applications. The Test Plug-In program may be used, for example, to verify communications connectivity, and test over-all performance of the computing system 5 within a larger communications infrastructure.

The System Manager 16. The system manager 16 is a server-side application that operates as a control center of the computing system 5. Just about everything that can be configured, tracked and managed in the computing system 5 may be accomplished through the system manager 16 application. Thus, the system manager 16 is an important application available to the administrator of the computing system 5. In general, the system manager 16 is provided with a user-friendly, easy to navigate interface encompassing all modules and related configuration settings. The system manager 16 application may be installed on a separate desktop computer 100 or notebook computer 100, but may also be installed directly on the computer where other system components, such as the gateway 14, or the server 12, are installed and running.

The system manager 16 application may also be installed on multiple computers 100 to provide a plurality of users with access to system information. Each person that is added as a user of the system manager 16 is automatically assigned "reader" rights within computing system 5. Reader rights means the user has a read-only view of all configuration settings, while users assigned "administrator" rights have an additional option to modify the configuration settings of each module within the computing system 5. Generally, changes to the configuration settings defined in the system manager 16 are valid in the computing system 5 from inception, and therefore these changes will immediately be reflected in the behavior of the computing system 5.

In some embodiments, more than one user at a time may be logged into the system manager 16 as an administrator. If an attempt to edit something in the system manager 16 is made while another user is already editing that same information, or information which has dependencies on the settings you are trying to modify, the system manager 16 will alert the user to a conflict.

The Packager. The Packager is a stand-alone application that allows you to bundle files into packages that can be loaded into the system manager 16 for automatic, remote installation to your mobile computing devices. These packages typically contain the files required to install a client 43, device driver 46 or a mobile business application. The Packager application allows a user to define where the files in a package will be installed, which files should be deleted from the mobile device, as well as modify registry settings in the operating system. The Client 43. The client 43 is an application that is installed on each mobile device 20. The client 43 provides for processing of requests 49 from enabled mobile business applications 44, which may be hosted by any one of a number of device types including hand held computers 100, tablet computers 100, and notebook computers 100. The client 43 provides functionality at the level of the mobile device 20. In general, the client 43 includes one to many self-running mobile applications and DLL (Dynamically Linked Library) files that are installed on the mobile device 20. The client may also include other forms, including a library to be linked with the target mobile business application.

Executable files for the client 43 include functions that directly execute mobile communications. The executable files generally process in cooperation with the device drivers 46 to provide management of the mobile device 20. Functions of the client 43 may also be accessed programmatically from a mobile business application 44, such as via the data services component and associated interface components.

The functions of the client 43 are generally designed to automate steps required to establish a connection 62 between a mobile device 20 and the gateway 14, which may be followed by a connection 64 to a server 12, which will then allow for the reliable and secure exchange data 28 between the mobile business application 44 and the process Plug-In 26*a*, 26*b*. Therefore, the functions provided by the client 43 include those required to establish the connections 62, 64 to a gateway 14 and server 12 using a supported communications adapter on the mobile device 20, functions to manage the automatic exchange of data encryption keys, functions to perform the automatic compression and encryption of data sent by a mobile business application 44 over the connection 62, 64, as well as functions for receiving and installing new mobile business applications 44 (and new versions of device drivers 46 and the client 43 itself) whenever packages containing these files are loaded centrally into the system manager 16.

The client 43 also performs changes in the configuration settings of the mobile device 20 based on how the device's property settings are defined in the system manager 16. Furthermore, the client 43 may perform dynamic selection of an appropriate connection path 62, 64 to be used between the mobile device 20 and a gateway 14/server 12 based on communication rules defined centrally in the system manager 16. Additionally, the client 43 may collect and transmit back to the server 12 all information regarding the operation of the client 43, as well as events logged by the mobile business application 44 and changes made to settings of the mobile device 20 so that this information may be viewed in log modules of the system manager 16.

Data Services. Data services of the computing system 5 generally include a set of interfaces that provides for mobile business applications 44 to use communications and data management functions. The data services are included in a client-side executable file, and are part of the client 43. A data service Plug-In is the server-side counterpart of the data service on the client 43.

Mobile business applications 44 can register themselves to use the data services by storing a configuration file in an application folder on the client 43. After an application 44 is registered to use the data services, the application 44 can use data service command files to upload and download data (48), which provides for leveraging features of the computing system 5 without having to use low level programming interfaces.

The Device Driver 46. Each device driver 46 includes an application that is designed to work with the client 43 and control a specific type of mobile device 20. Device drivers 46 may be published, for example on the Internet 121, and downloaded as needed. Device drivers 46 so obtained may be installed into the computing system 5 to provide that system with the ability to manage new types of mobile devices 20. New and updated device drivers 46 may be installed in using the system manager 16. When a new device driver 46 is installed, the system manager 16 reads the associated information file for the device driver 46 and uses this information to create new entries in the database 15. Entries in the database 15 show that a new type of mobile device 20 is now supported in the computing system 5, and any configuration properties that may be used to remotely modify and retrieve settings for the new mobile device 20.

The Loader 45. The loader 46 is an application that is installed on the mobile computing device the first time it is put into use. The loader 45 application is used on the mobile device to register that device to a specific computing system 5. After the registration has been processed in the system manager 16 by an authorized administrator, the loader 45 can connect to a gateway 14 and server 12 for the first time. The loader 45 will automatically download and install to the mobile device the latest versions of the appropriate software packages: the client 43, device driver 46s, and a mobile business application as well as retrieve the device settings defined for it in the system manager 16 and call on the device driver 46s to configure the mobile computing device and all peripherals in the device set. After an enabled mobile business application is installed, this mobile application and the client 43 will cooperate to perform any future software updates on the mobile device as well as update device settings. Therefore, the loader 45 is needed only at the beginning when a new mobile device, or fully reset mobile device, having only an operating system installed, is to be provisioned for use.

The Database 15. The database 15 is generally located on a server-side computer 100. In some embodiments, the database 15 runs on SQL Server (available from Microsoft Corporation of Redmond Wash.). Generally, the database 15 is the central structured repository of computing system 5 configuration settings that control how a given computing system 5 will operate. The database 15 also stores log transaction information that is created within the computing system 5, all software packages available for distribution to mobile devices 20, and all Plug-In (25, 26, test) programs available within the computing system 5. The database 15 may be automatically created, such as during the initial steps of installation of the computing system 5, such as by using a system setup 23 application for the database 15.

Microsoft SQL Server. Components of the computing system 5 operate according to the configuration settings defined in the system manager 16 and stored in the database 15. The Microsoft SQL Server application, which is itself not a component of the computing system 5, handles requests 49 from applications of the computing system 5 to access the database 15. Therefore, the computing system 5 includes access to a properly configured and operational Microsoft SQL Server application and the database 15. Of course, the use of Microsoft SQL Server is merely illustrative and is not limiting of the teachings herein.

Mobile Business Application 44. The mobile business application 44 (or simply "mobile application" 44) is a software program that runs on a mobile device 20. The mobile application 44 is not a component of the computing system 5, per se, even though it can be designed to interact closely with computing system 5 (such as via the client 43) and is a part of a complete mobile business system solution. The mobile application 44 may be directed to anything desired by users, developers and the like. The mobile application 44 may serve the needs of a particular industry or organization, it may be simple and require only regular batch transfers of data, or it may be complex and require many different types of on-line data exchanges 48. Mobile business applications provide users with the business level functions needed to perform their work, such as taking an order, issuing an invoicing, or documenting a service incident.

These applications may be as simple or as complex as is warranted by the business processes they are designed to support. The enabled mobile business applications are designed to work together with the client on the mobile computing device, thereby leveraging the device management, data management, communications management and communications security features that are an integral part of without having to custom develop and maintain this widescope of generic functionality, for each mobile computing system solution that is implemented.

Having thus introduced aspects of the computing system 5, further detail of specific aspects of the protocol and system of this disclosure are now introduced.

Protocol

As previously indicated, the gateway 14 is a server-side application that functions as an entry point into the system. A client 43 that requests to establish a connection process as discussed below and exchange data in computing system 6 must first connect to the gateway 14 for authentication. After the gateway 14 has determined the validity and access rights of the connecting mobile computer 20, the gateway redirects the requests coming from the client to the server 12, based on the identifier of the system plug-in process 25 being requested and the current processing load of each computer presently running a server.

Communication Processes. A communication process is the uniquely identifiable request for an exchange of data that is initiated by the mobile business application 44 via the client 43 on the mobile device 20 and transmitted to and possibly responded to by plug-in 26 running on the server 12. The contents of the communications process, or simply "process" for short, may be anything the developers of the mobile application and the plug-in program agree to exchange. This means that so long as the mobile application and plug-in are both "aware and synchronized" with respect to how the data that is being sent by each side should be processed and responded to by the other side, the actual data transmitted is entirely up to these applications, and is in no way constrained by the system.

The system will support any and all data transfers with virtually any mobile application and any host system. The data can be text, XML formatted, binary, etc. It can also be pictures, movies, GPS data, device health monitoring data, as well as any other form of business or personal data.

Hence, the plug-in may include data of a business or personal or other kind in a wide variety of formats including text, XML, binary, or other format.

Process numbers 50 are assigned and used by mutual agreement between the developer of the mobile application and the developer of the plug-in program—process numbers are embedded in these cooperative programs and are not modifiable using the manager 16. To install the plug-in program 26 using the manager 16, the plug-in's associated PLI file (plug-in Information file) which contains the information needed to install the plug-in, such as process numbers, process versions, process properties, process descriptions etc. is selected and stored by the manager 16 in the database 15 together with a binary copy of the plug-in program 26. The plug-in program is installed automatically on the server 12 as a result of having one of the processes that it supports assigned to that server, the assignment being controlled by the manager 16. Using the manager, selected settings can then be modified for the plug-in 26 as well as assignments made of the connection paths that may be valid for each of the processes which the plug-in can handle. Based on this information, the gateway 14 and the server 12 are able to properly route each process requested by a mobile application 44 to the plug-in 26 responsible for managing that process.

While the process may be as simple as uploading a file from the mobile device 20 to the server side computer, a process can also be much more complex. For example, it can involve a series of integrated requests and responses such as when a person uses a mobile application to interrogate an ERP application on-line over a GPRS connection to check the stock status of an item or post a new customer order and schedule product deliveries.

The method by which a request for the exchange of data, initiated by the mobile application 44, is routed in the system to the appropriate server and plug-in for processing, is a function of the unique identifier of each process (the process number 50), the connection paths 62, 64 that is defined in the manager 16 and the gateway 14, the server 42, and the client applications 44 that run the core of system. As disclosed below, the "process number" 50 and the "connection path" 62, 64 define how data is routed between applications—that is, from a mobile device to the server side computer 62, 64.

In the system each process requested by the mobile application 44 is identified by its process number 50. Each requested process number 50 must coincide with a process number 70*a*, 70*b* that is coded inside the plug-in that is called by the server on which it is installed. The plug-in is responsible for managing the incoming process request from the mobile application (receiving the data, processing the data as needed and responding to the received data as expected according to the data exchange interface agreed upon between the developers of the mobile application 44 and the plug-in 26).

Each plug-in can support one or more processes based on the process numbers 70 encoded in the plug-in itself. The manager 16 serves as an administrator to view which plug-in 70 is installed on which server as well as the type of processes each plug-in supports and their process numbers. Moreover, the gateway application 14 which is responsible for authentication and redirection of the client 43 request to the server application 12, determines which servers are able to manage the incoming process by looking at the process number 50 sent by the client 43 and comparing it to the process number coded in each plug-in 26 that is registered in the database 15 together with the servers 12 on which it is available.

Figure 2:
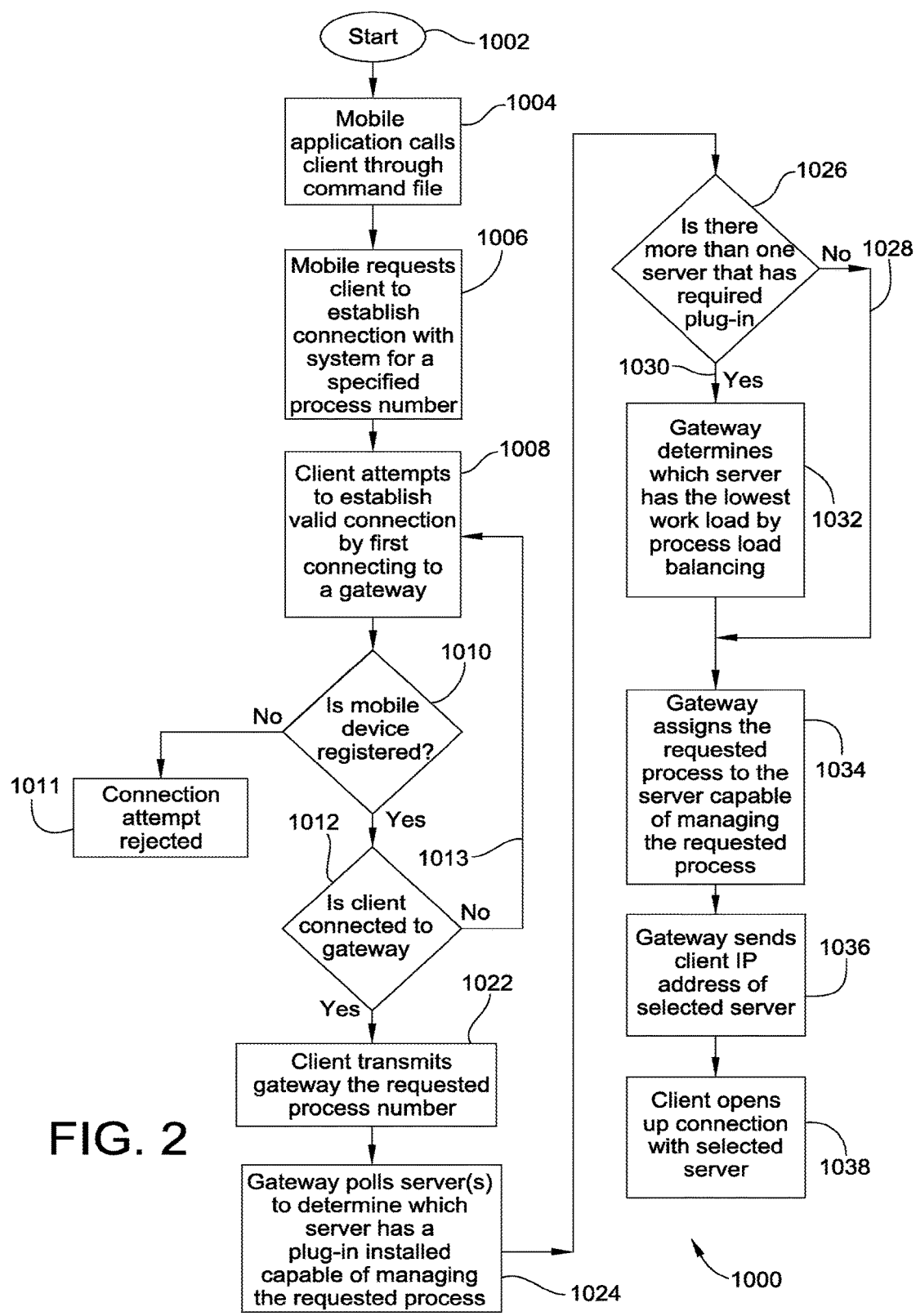
FIG. 2 shows an illustrative embodiment of a client request of a network to establish a valid connection to the network according to the present disclosure.

As an illustrative example, FIG. 2 shows a client request of a network 1000 to establish a valid connection to the network. The process starts at step 1002. As indicated, at step 1004 the mobile application (44 in FIG. 1) that will exchange data with a server side computer (12 in FIG. 1) calls the client (43 in FIG. 1) through an XML interface of the data service (command file) (not shown). At step 1006, the business application (44 in FIG. 1) requests from the client (43 in FIG. 1), via the client XML file, to establish a connection to system (core infrastructure 1 in FIG. 1) for a specified process number. When the client (43 in FIG. 1) receives a request for a particular process number, from the mobile application (44 in FIG. 1), at step 1008, the client attempts to establish a valid connection to system (core infrastructure 1 in FIG. 1) by first connecting to the gateway (14 in FIG. 1) and transmitting to it the requested process number (50 in FIG. 1). The connection may be by LAN, WiFi, GPRS, or other manner of communication. In this example, it is noted that the business application is signaling the client to initiate the communication with the host system. However, the host system (10 in FIG. 1) may also signal the client to initiate a communication session with the client by use of push technology as further described below.

At step 1010, the gateway determines if the mobile device has been registered. If the mobile device has not been registered, the process advances to step 1011 where the connection attempt is rejected. If the device has been registered, the attempt to connect is permitted.

A prerequisite to using the disclosed system is that the mobile device be registered with the gateway. Part of that registration process is the acceptance by the network manager of the request from a mobile device to register. Once registered, the manager assigns the newly registered mobile device appropriate device set templates for provisioning with appropriate device settings for use in the disclosed network communications. Particulars on how a device setting may be used in the management of network communications can be found in application entitled "System and Process for Managing Network Communications" filed contemporaneously herewith which is incorporated herein by reference.

As previously indicated, if the device has been registered, the attempt to connect is permitted and the mobile device can attempt to make a connection with the gateway. At step 1012, if the client is unable to get connected to the gateway, the client returns to step 1008 to attempt to establish a valid connection to the gateway. Once the client establishes a valid connection to the gateway at step 1012, the client transmits to the gateway the requested process number. At step 1024, the gateway polls the servers to determine which servers has a plug-in installed that is capable of managing the requested process. At step 1026, the gateway determines if there is more than one server that has the required plug-in. If the gateway determines that there is only one server that has the required plug in, the process advances to step 1034 where the gateway assigns the requested process to the server having the required plug-in. If at step 1026, the gateway determines that there are more than one server having the required plug-in, the process advances to step 1032 determines which server has the lowest work load by a process of load balancing as described in FIG. 3. At step 1034 the gateway assigns the requested process to the server capable of managing the requested process. At step 1036, the gateway forwards to the client the IP address of the server that the gateway has assigned to manage the communication with the client. At step 1038, the client opens up a connection with the selected server. It is the gateways assignment of the management of the process to server at step 1034 and the forwarding of that IP address of the server to the client that allows the client to open up a connection with the selected server in step 1038. In a private network, the gateway will forward the IP address of the server directly to the client. In a public network, the provisioning of the client with the IP address of the selected server is described in greater detail below.

As previously discussed, the device driver 46 is an application designed to work with a respective client 43 and control a specific type of mobile computer 20. The device driver enables the client to interact with the mobile computer supported by the driver. The driver application is not registered; rather the client can capture unique information about the mobile computer (e.g., its serial numbers) and submit those device identification credentials to the network where they can be accepted or denied by the administrator. Mobile computers that are successfully registered in the system, that is to say, approved by the administrator, can be provisioned for use and begin to exchange data.

In this way, the gateway (14 in FIG. 1) uses the process number (50 in FIG. 1) to determine the appropriate server (12 in FIG. 1) to which the given client may be directed. The gateway determines which server should be used by the given client by determining which servers have a plug-in installed that is capable of managing the requested process, and also taking into consideration which one of these servers presently has the lowest work load according to a load balancing process as explained below.

Messaging Protocol

Figure 3:
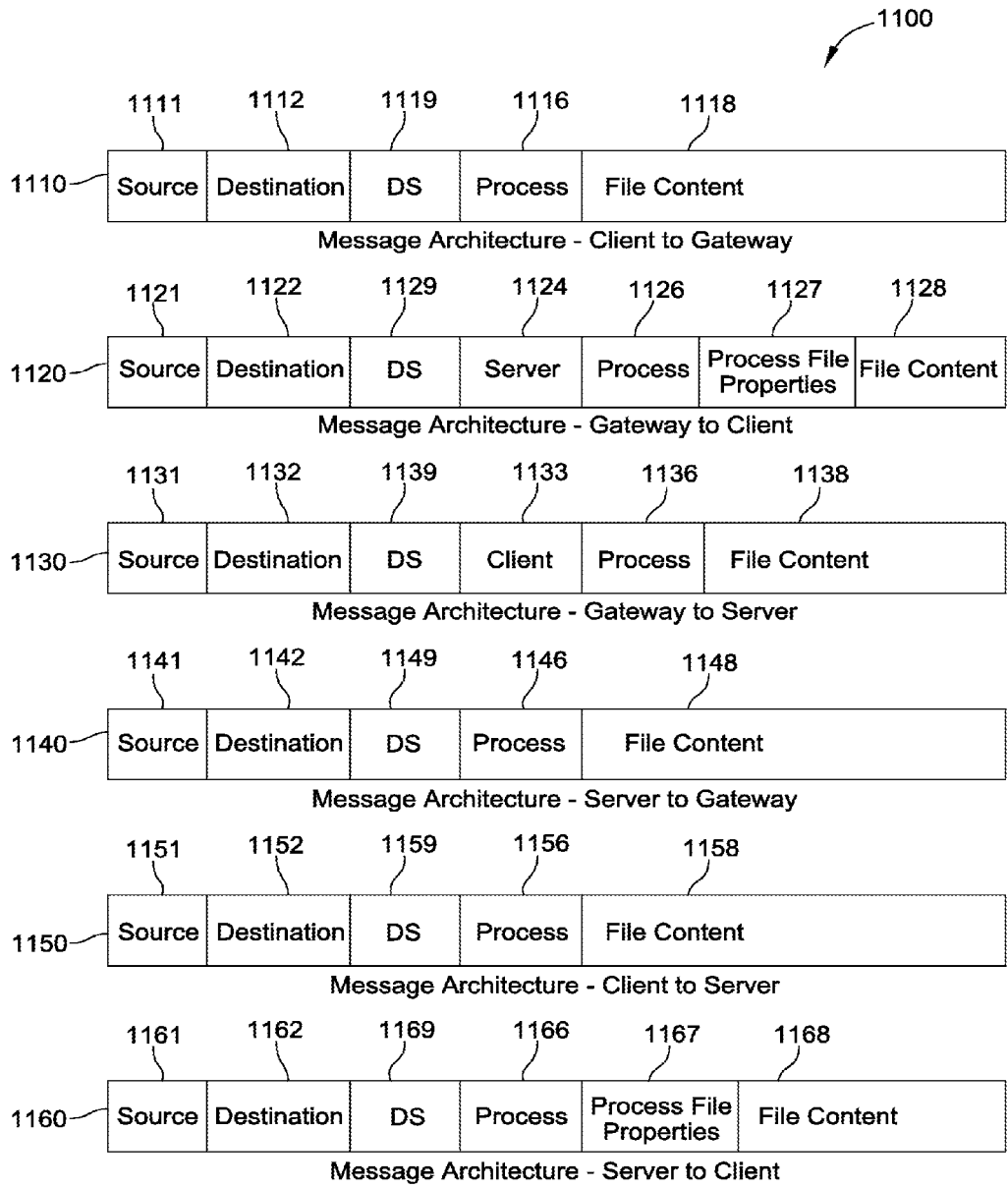
FIG. 3 shows an illustrative embodiment of messaging protocols according to the present disclosure.

FIG. 3 is an illustrative embodiment of messaging protocols for system messaging 1100. System messaging illustrates an instruction set including a messaging protocol 1110, a messaging protocol 1120, a messaging protocol 1130, a messaging protocol 1140, a messaging protocol 1150 and a messaging protocol 1160 according to this disclosure for communication between a client, a gateway, and a server. More specifically, messaging protocol 1110 is a messaging architecture for messages that are transmitted from the client to the gateway, messaging architecture 1120 is a messaging architecture for messages that are sent from the gateway to the client. Messaging protocol 1130 is a messaging architecture for messages that are sent from the gateway to the server and messaging protocol 1140 is a messaging architecture for messages that are sent from the server to the gateway. Messaging protocol 1150 is a messaging architecture for messages that are sent from the client to the server and messaging protocol 1160 is a messaging architecture for messages that are sent from the server to the client.

Messaging architecture 1110 includes a source field 1111 which is the address of the client requesting a process, a destination field 1112 which is the destination address of the gateway, a shared data service field 1119 which is a field indentifying whether the client message is originating from a data service (41 in FIG. 1), a field 1116 identifying the process identification number requested by a business application, and a field 1118 for containing a message. Messaging architecture 1120 includes a source field 1121 which is the address of the gateway responding to a client request for a process, a destination field 1122 which is the destination of the client requesting the process, a data service field 1129 which is a field indentifying whether the client message requesting the process number originated from a data service, a field 1124 identifying the address of the server with which the client will establish a connection for the download of the process requested by the business application, a field 1126 identifying the process identification number requested by the business application of the client, a field 1127 which includes the properties of the process file to be downloaded, and a field 1128 for containing a message.

Messaging architecture 1130 includes a source field 1131 which is the address of the gateway, a destination field 1132 which is the destination address of the server that will establish a connection with the client to download the process, a data service field 1139 which is a field indentifying whether the client message requesting the process number originated from a data service, a field 1133 which is the address of the client whose business application is requesting the download of the process, a field 1136 identifying the process identification number requested by the business application, and a field 1138 for containing the message. Messaging architecture 1140 includes a source field 1141 which is the address of the server initiating the message to the gateway, a destination field 1142 which is the destination address of the gateway, a data service field 1149 which is a field identifying whether the client message requesting the process number originated from a data service, a field 1146 identifying the process identification number requested by the business application, and a field 1148 for containing the message.

Messaging architecture 1150 includes a source field 1151 which is the address of the client requesting the process, a destination field 1152 which is the destination address of the server with which the client will establish a connection to download the process, a data service field 1159 which is a field indentifying whether the client message requesting the process number originated from a data service, a field 1156 identifying the process identification number requested by the business application, and a field 1158 for containing the message. Messaging architecture 1160 includes a source field 1161 which is the address of the server that will establish the connection with the client to download the process, a destination field 1162 which is the destination address of the client that will receive the download of the process, a data service field 1169 which is a field indentifying whether the client message requesting the process number originated from a data service, a field 1166 identifying the process identification number requested by the business application, a field 1167 which contains the properties of the process file to be downloaded, and a field 1168 for containing the message.

Advantageously, the inclusion of a data services field in the message architecture used to route the message that is requesting a process number through the network enables the network to route that message based upon whether the data service field indicates the message to be originating from a data service or not. If the field indicates the message has originated from a data service on a client, the network knows that the data service residing on a client is providing the network communications between a plurality of mobile applications on a source and the network for the process number and so may route and manage the message according to the teachings of this disclosure. In other words, the network knows that the shared data service process is advantageously taking care of details such as initiating network communications, opening a network connection to a gateway server, determining the server with which it will communicate, etc. The network thus knows that it can take care of managing each data service process in the network and the process numbers requested by the business applications through the shared data service. However, if the data service field indicates the message is originating from a client but not from a data service on a client, the message may be routed and managed using typical routing protocols and architecture. Thus, the message architecture disclosed herein advantageously allows the network to recognize and manage a message requesting a process number originating from a data service in accordance with the teachings of the disclosure.

The foregoing may be used in a system for managing communication over a network. The system includes a plug-in detector to generate a control signal responsive to an instruction code of a variable-length instruction set. The instruction code includes a source address field, a destination address field, and a field for identifying a process number for configuring a data service residing on a client on a mobile computer that provides network communications between one or more mobile applications on the mobile computer and a network. The process number of the foregoing system is associated with a set of one or more predetermined rules for establishing communications between the one or more mobile applications on a mobile computer and the network using the plug-in.

The foregoing also shows the method for communicating a message over a network may include the steps of: providing a message having a source address field, a destination address field, and a field for identifying a process number for configuring a data service residing on a client on a mobile computer that provides network communications between one or more mobile applications on the mobile computer and a network. In another embodiment, a data service field is provided for identifying whether the client is executing a single instance of a data service that provides network communications between a plurality of business applications on the mobile computer and a server.

The foregoing illustrates that the process number identifies a plug-in to manage a data communication between the one or more mobile applications on the mobile computer and the plug-in. In another embodiment, the management of the communication between the one or more mobile applications on the mobile computer and the network by the plug-in includes interpreting the data received from the one or more mobile applications on the mobile computer. In another embodiment, the management of said communication between the one or more mobile applications on the mobile computer and the network by said plug-in includes retrieving new data from the network and handing said data back to a server for deliver back to said one or more mobile applications.

In another embodiment, the method further includes the step of associating with the process number a set of one or more predetermined rules for establishing communications between the one or more mobile applications on a mobile computer and the network using the plug-in. In another embodiment, the method further includes the step of defining the set of one or more predetermined rules for extablishing communications between the one or more mobile applications on a mobile computer and the network using the plug-in is by a network manager. In another embodiment, the method further includes the step of downloading the set of one or more predetermined rules for establishing communications between the one or more mobile applications on a mobile computer and the network using the plug-in to the client on the mobile computer at the start of a communication between the one or more mobile applications on the mobile computer and the network. In another embodiment, the one or more mobile applications support data transfers of business or personal data.

Figure 4:
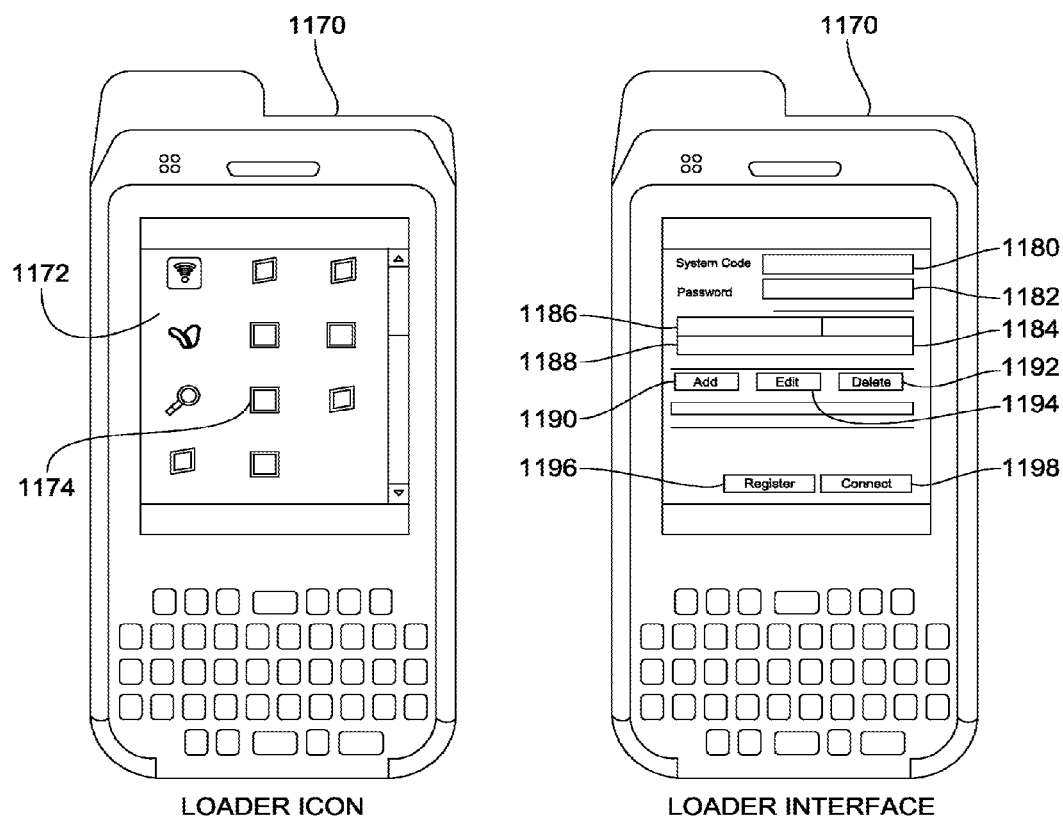
FIG. 4 shows an illustrative embodiment of a mobile computer wishing to download a process according to the present disclosure.

As shown in FIG. 4, a mobile computer 1170 wishing to download a process will call up an application program 1174 in the mobile computer that provides the graphical user interface that allows the user of the mobile computer to enter the process number and message information into the mobile computer in a manner in which the mobile computer will recognize the entered data. The user enters his system code 1180 and his password 1182 to open up the application program. A system code is a code used by the network for identifying a group of network users within the network. The group of network users within the network identified by the system code may be taken from the group consisting of deployment group, connection group, mandatory server group, and remote assist operator group. The group of network users identified by the system code may include an identification of individual users of the network. The individual user identification may be taken from the group consisting of employee. For details on the system code and how it may be used by the network to establish and manage network communications between a plurality of mobile applications on a mobile computing device and a server can be found in application entitled "System and Process for Managing Network Communications" filed contemporaneously herewith and is incorporated herein by reference.

In the illustrative example, the system code 1180 shows an IP addressed host name 1188 at 192.168.1.175 and a TCP Port 1184 as 50001. Using add button 1190, edit button 194, and delete button 192, the user may add, edit, or delete the host name 1188 and TCP Port 1184. Once signed in, the user may register with the system by depressing button 1196 and once registered may connect to the system by depressing button 1198.

The application program which may be part of the graphical user interface or be a separate application, will translate the data entered by the user into a data transmission format that comports with message protocol 1110 such that the message may be recognized by both the network that the mobile computer is operating within and the mobile computer in the network.

Once the data has been entered through the graphical user interface and translated by the application program, the message is ready for transmission. Although in this illustrative example, data is entered through the graphical user interface, it should be noted that not all data that is to be transmitted has to originate from user input through a mobile business application GUI. For example, data transmission could be triggered based on temperature sensors in the cold storage of a truck's trailer, and the data to be transmitted could be the Device ID, GPS location and temperature data from the sensors. As another example, a trigger may be based on a device location. In this case, a device entering into or out of defined zones (e.g., based on GPS coordinates), could trigger an automatic upload of all data from the device followed by a device wipe. None of these inputs may be user inputs yet each of these inputs could trigger a communication with the network as previously described in connection with automated, self-triggered transmissions.

On depressing the send button on the mobile computer, the entered message is transmitted from mobile computer to the network of the mobile computer via LAN, WiFi, GPRS, or other communication medium. At the network, the network will parse the fields that make up the message and look at the header field. From the data service field message, the network knows that this message is originating form a shared data service and so will route this message according to this disclosure to the gateway. At the gateway, the gateway will determine from the message architecture 1110 illustrated in FIG. 3 the client address 1111 and the process 1116 being requested, as well as any message 1118 that is provided by the client and the gateway will assign the management of the process to one of the servers in the network as discussed below. The data services field 1119 may provide the data service stamp on this message to maintain the identity of this message throughout the network as a one that originated from a data service. The gateway uses messaging protocol 1130 illustrated in FIG. 3 for delivering the message to the server that has been assigned the management of the process by the gateway. Specifically, from the messaging protocol 1130, the source field 1131 will provide the server with the IP address of the gateway that is sending the message, the client field 1133 will provide the server with the IP address of the client that requested the download of the process, the process field 1136 will identify the process that is to be downloaded, and the field 1138 provides the server with any message. The data services field 1139 may provide the data service stamp on this message to maintain the identity of this message throughout the network as a one that originated from a data service. In acknowledging the assignment and in communications with the gateway, the server will use message architecture 1140 illustrated in FIG. 3. The field 1141 provides the gateway with the IP address of the server initiating the message to the gateway, the field 1146 identifies the process number to which the message is directed, and the field 1158 contains any message. The data services field 1149 may provide the data service stamp on this message to maintain the identity of this message throughout the network as a one that originated from a data service.

Once the gateway has made the assignment to the server and the server has acknowledged and is ready to establish a connection with the client requesting the business process, the gateway will forward to the client the information required by the client to establish the connection with the assigned server. The gateway uses message protocol 1120 illustrated in FIG. 3 for this message. Field 1124 tells the client the IP address of the server 1124 that the client must use to establish the connection. The data services field 1129 may provide the data service stamp on this message to maintain the identity of this message throughout the network as a one that originated from a data service. The client will establish a communication session with the requested process on the assigned server using message protocol 1150. Field 1151 provides the server with the IP address of the client. The server will match the IP address of the client in field 1151 with the client address that the gateway provided the server in field 1133 of the message that the server received from the gateway that made the assignment to the server to manage the process. The server will also match the process requested by the client identified in field 1156 of the message from the client with the process number that the gateway provided to the server in field 1136 of the message sent by the gateway to the server in making the assignment. The server will communicate with the client using the message protocol 1160 which the client will parse to extract information telling the client how the mobile application can connect with the process 1166. The client will also extract information from field 1167 on the settings of the mobile computing device required for the mobile application to exchange data with the process. The data services field 1169 may provide the data service stamp on this message to maintain the identity of this message throughout the network as a one that originated from a data service.

The client will then establish a communication session with the Plug-In Process on the target server which allows for data to be exchanged bi-directionally between the plug-in process and the mobile application that requested the process. Based on the bi-directional exchange of data between the plug-in process and the mobile application, the mobile computer is configured with the settings provided by the plug-in in order to enable the business application to seamlessly connect and communicate with the network.

Registering and Provisioning New Devices

As indicated at steps 1004-1020 of FIG. 2, before any mobile computer can connect to the system (core infrastructure 1) it must be registered for use in that system. To facilitate this process the mobile computer must have a live network connection through which the gateway and the server can be reached. As shown in FIG. 4 and previously discussed, a user may launch the Loader application 1174 on the mobile computer and click on the register button 1196 to make this registration. If a message indicating successful registration is received after registration of the message, the authentication credentials generated for the given computer's hardware was successfully received by the gateway. After an administrator accepts the remote device registration in the Manager (and assigns the newly registered device set to the appropriate device set template) the mobile computer will then be able to reconnect and have the mobile computer automatically provisioned with the correct device settings and software.

In the event that a registered mobile computer is cold booted (thereby resetting the computer to its default factory state) it is not necessary to re-register the computer to provision it since the registration credentials of the mobile computer resides on the network. A user may simply launch the Loader application on the computer and click the Connect button to initiate the provisioning process.

Figure 5:
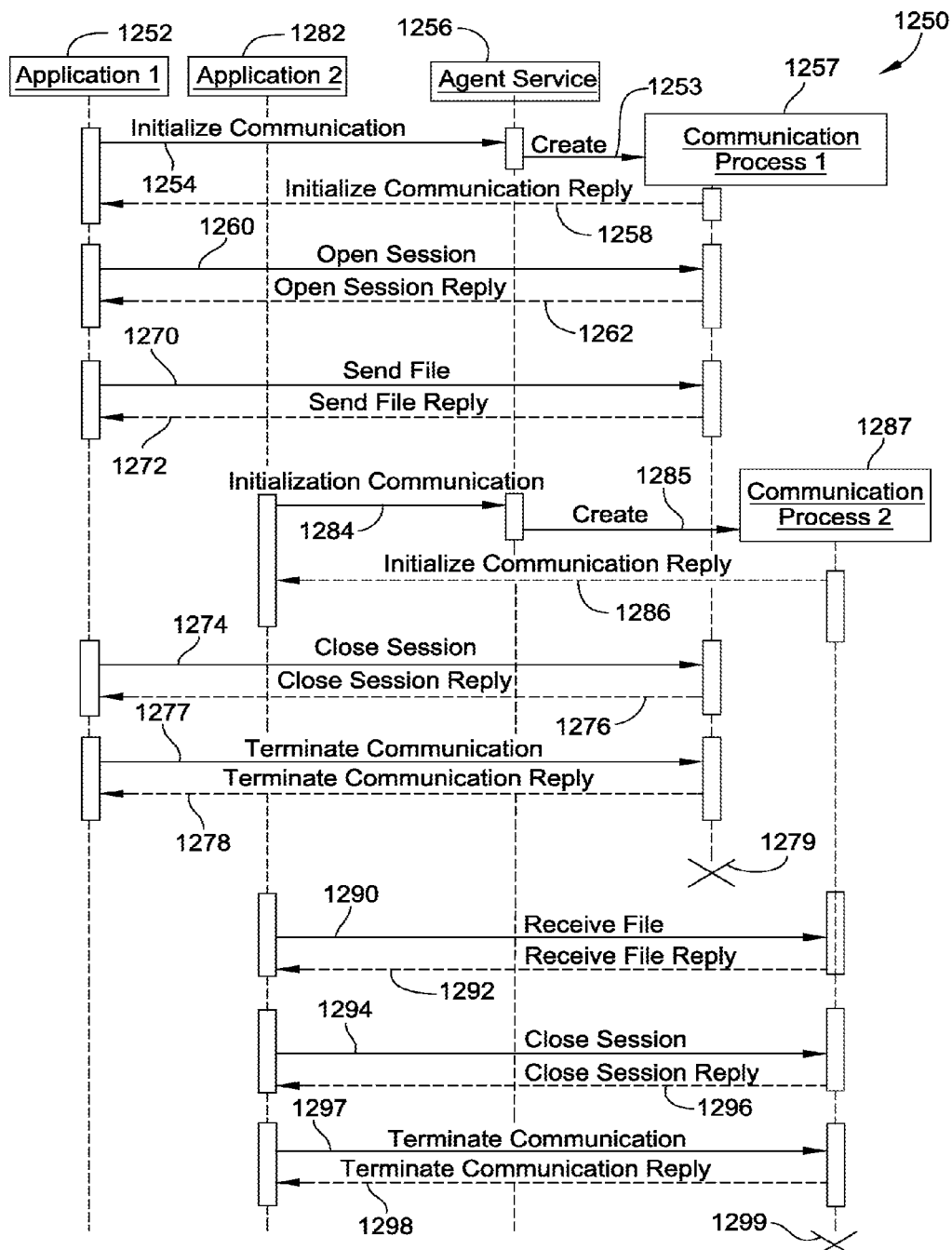
FIG. 5 shows an illustrative embodiment of the system setup and management of connection paths according to the present disclosure.

FIG. 5 shows in greater detail the system setup and management of connection paths. FIG. 5 illustrates aspects of establishing communications within a computing system. More specifically, FIG. 5 illustrates a timing diagram for establishing communications between various mobile applications 1252, 1282 and the servers (12 in FIG. 1) of a computing system (5 in FIG. 1). FIG. 5 shows a server 12 and a gateway (14 in FIG. 1) performing certain actions in conjunction with two mobile applications 1252, 1282 via a single data service 1256 (of a client 43 in FIG. 1) which is shared there between. Indeed, in some cases the mobile device (20 in FIG. 1) and/or client thereof is configured so that all business applications 1252, 1282 on the mobile device must route all of their process requests through the data service. The computing system of embodiments can also be configured to help enforce the routing of all data exchange requests through the data service 1256 through, perhaps, refusing to establish communications from any other source.

FIG. 5 illustrates mobile application 1252 initiating a communication request by, for instance, requesting that a particular process be executed by the server. See reference 1254. The data service 1256 receives the request from the mobile application 1254 and, routes it (along with the applicable process number) to the gateway. More specifically, the data service 1256 determines which type of connection is appropriate (based on the process number and priority) and makes its own communication request over an appropriate connection. See reference 1253. The gateway subsequently selects a server for handling the process request. At reference 1258, the selected server returns a reply to the request to initialize communications by the mobile application 1252 to that mobile application over the connection selected by the data service 1256.

With communications thereby established, the mobile application 1252 opens a session with the server (with the aid of the data service 1256 in some embodiments). See reference 1260. Responsive thereto, the server sends a reply acknowledging the opening of the session as illustrated by reference 1262. When the mobile application 12252 is ready to receive the data from the pertinent process, it sends a request for a data exchange (and/or file) within that connection. See reference 1270. The server, responsive thereto, executes the requested process and sends the resulting data at reference 1272.

At some point it might be the case that mobile application 1282 requests that a process be initiated so that it too can exchange data with some server of the computing system. Reference 1284 illustrates such a process request. The data service 1256 again determines which type of connection is indicated by the requested process number and the priority of the connection type. It then establishes a connection of the indicated type over a connection of the indicated type and forwards the process request and number to the gateway. See reference 1285. The server selected by the gateway sends a reply acknowledging the request to the business application 1256 thereby establishing a connection (with, in some embodiments, the aid of the data service 1256). See reference 1286. Note that, if circumstances warrant it, the exchange with the mobile application 1256 could result in either a brand new connection or a new session within the connection already established with mobile application 1252 as further below. In the current scenario it can be assumed that a new session is created within the existing connection. That is, the existing connection is of a type suitable for the process requested by mobile application 1282. However, it could also be the case that the data exchange with mobile application 1282 occurs by way of an other session even though this is not illustrated.

With continuing reference to FIG. 5, at reference 1274, the mobile application 1252 could close its session with the server. Reference 1275 illustrates the server sending a reply acknowledging the closure of the session. If all such sessions between mobile application 1252 and the server are closed, mobile application 1252 can send a message to the server indicating that communications are to be terminated with it. See reference 1277. At reference 1278 the server can acknowledge the termination of the communication with the mobile application 1252. Such an exchange ends the communications between the mobile application 1252 and the server in the current scenario. But the ending of the session with mobile application 1252 advantageously does not end the connection that exists between the data service 1256 since the data service, and not the mobile application is controlling that session on the client-side and so the control of that connection is in the hands of the data service and not the mobile application. This control enables more efficient use of connections between the network and the mobile device which leads to more efficiencies and better management of mobile devices on the network.

The other mobile application 1282, in the meantime, could have reached a condition in which its programming indicates the desirability of receiving a file from the server in which it is in communication. It therefore sends a message to the server indicating that the requested process should execute so that it can receive the file. See reference 1290. Responsive thereto, the server can send a reply (with, perhaps, the requested file) at reference 1292.

Furthermore, once the requested file is received (or the requested data exchange ends), the mobile application 1282 and the server can close the session through which they have exchanged that data. See references 1294 and 1296. If, moreover, all sessions over the connection between the mobile application 1282 and the server are thereby closed (and all other sessions on that connection are closed), the mobile application 1282 and the server can terminate communications and/or close that connection. See references 1297 and 1298.

In the previous illustrative example, the term "File" was used. It should be noted that the term "File" as used in this example does not need to be a file in the conventional sense of the term, but more generally speaking it is "Data". For example, the "Data" may be data that is transmitted between a host system and a mobile business application, through the disclosed system, that may only be kept in memory as an array and never actually take the form of a file in the classical sense. Hence, in more real time operations via HTTP, web services, etc., the disclosure is not limited to classical files being transmitted but more generally may include streaming data in a dialog between the mobile business application and host system, via the disclosed system.

Process Load Balancing. Each gateway (14 in FIG. 1) continuously monitors the status and processing load of all servers running in a system. Based on this continuously updated stream of information the gateway will route a client and each newly requested process to the server that is presently capable of handling the request and providing the best response time. A server (12 in FIG. 1) is considered capable of handling the request if it has a plug-in installed that contains a process identified by a process number that is the same as the process number of the incoming request. This function provides the benefits of "load balancing" because it distributes the full load of incoming process requests among the available servers (meaning all servers that are capable of managing each request by having the appropriate plug-in installed) based on how heavily each server is presently being utilized.

Figure 6:
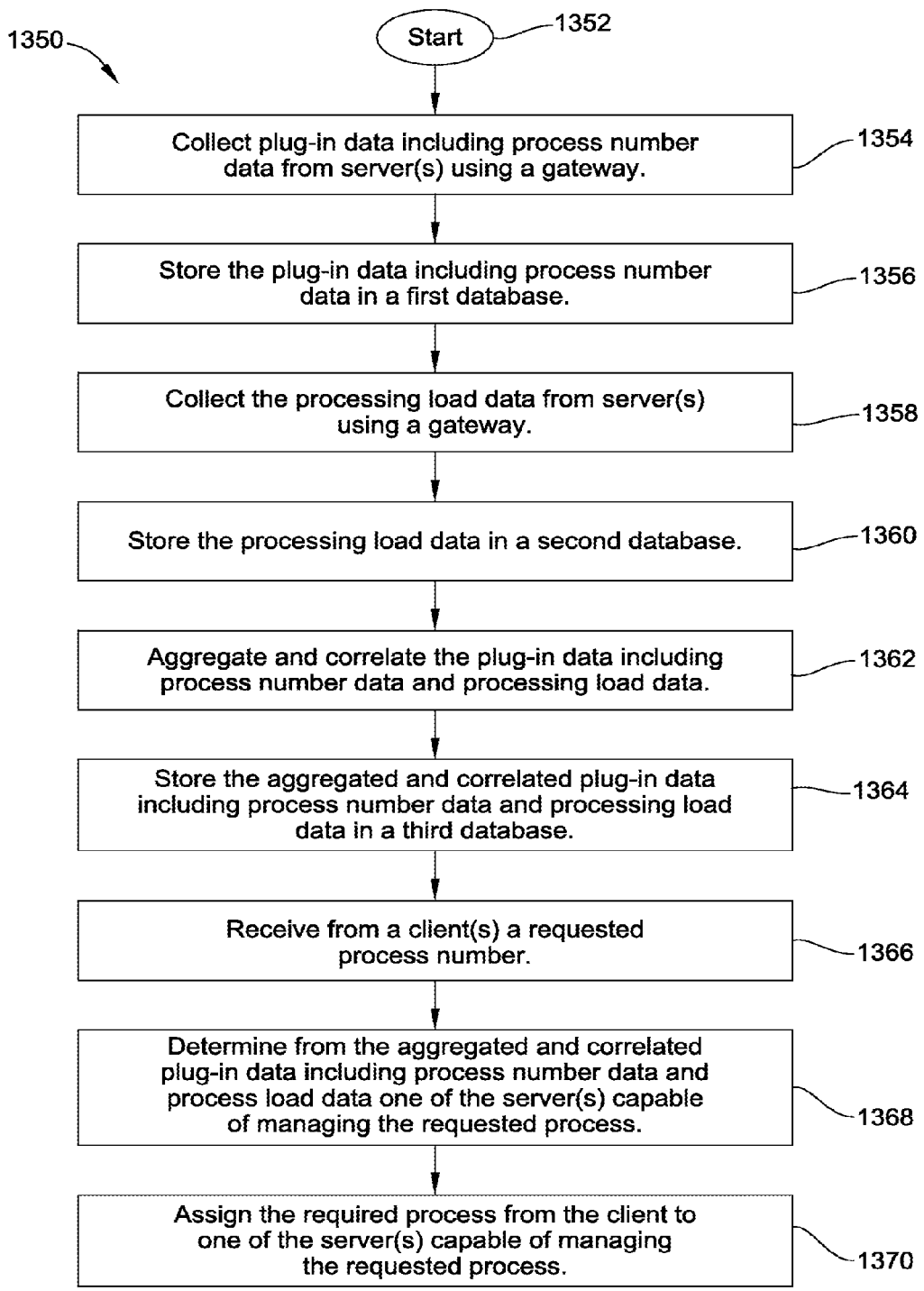
FIG. 6 shows an illustrative embodiment of a process by which a gateway may monitor the status and balance the load of the servers running in the system according to the present disclosure.

FIG. 6 shows one illustrative process 1350 by which a gateway (14 in FIG. 1) may monitor the status and balance the load of the servers running in the system. The process starts at step 1352. At step 1354, the gateway collects plug-in-data including the process number data from all servers using the gateway. At step 1356, the gateway stores the plug-in data including process number in a first database. At step 1358, the gateway collects the processing load data from the servers (12 in FIG. 1). At step 1360, the gateway stores the processing load data in a second database. At step 1362, the gateway aggregates and correlates the plug-in data including process number data and processing load data. At step 1364, the gateway stores the aggregated and correlated plug-in data including process number data and processing load data in a third database. At step 1366, the gateway receives a requested process number (50 in FIG. 1) from the client. At step 1368, the gateway determines from the aggregated and correlated plug-in data including process number data and processing load data a one of the servers capable of managing the requested process. At step 1370, the gateway assigns the requested process from the client to the one of the servers capable of managing the requested process. While the foregoing describes the use of three databases, in practice all this can and is stored in a single database. Active Fail-Over. In the event that any server (12 in FIG. 1) should fail to respond to the special server monitoring service of a gateway (14 in FIG. 1) (such as may happen when there is a physical hardware failure of the server's computer or the server's computer is inadvertently shut down) the gateway will automatically trigger active fail-over functionality which will inactivate the problematic server in the list of available servers and redirect all subsequent client process requests to other servers capable of managing the specific processes. When the problem with the inactive server has been resolved the server will automatically notify the gateway that it is again available for processing whereby the gateway will reactivate it and the server will continue normal operation within the system.

Figure 7:
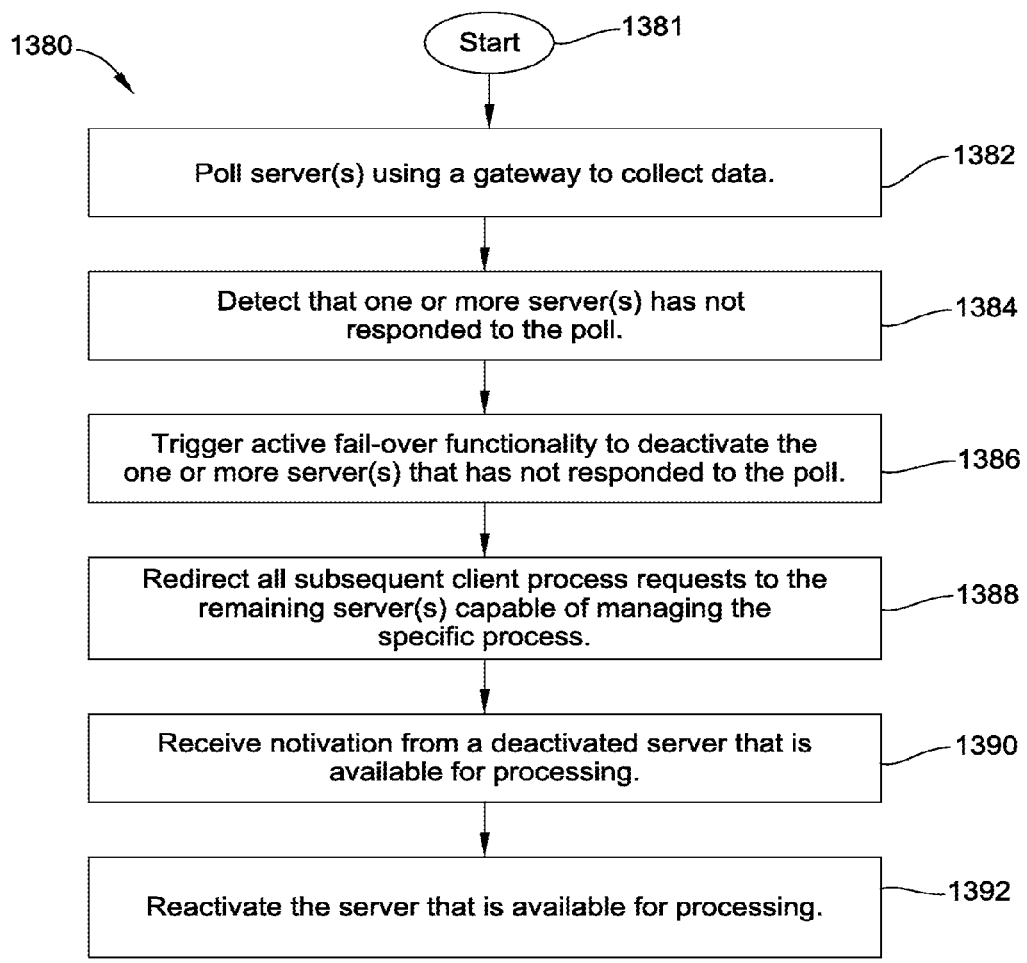
FIG. 7 shows an embodiment of a process by which a gateway may activate fail-over functionality according to the present disclosure.

FIG. 7 shows one process 1380 by which a gateway (14 in FIG. 1) of the system may activate fail-over functionality. The process starts at step 1381. At step 1382, the gateway polls the servers (12 in FIG. 1) connected to the gateway to collect data on the operation of the server. At step 1384, the gateway detects that one or more servers are not responding to the poll. At step 1386, the gateway will activate fail-over functionality to inactivate the one or more servers that has not responded to the poll. At step 1388, the gateway redirects all subsequent client process requests to remaining servers capable of managing the specific process. At step 1390, the gateway receives notification from a deactivated server that it is available for processing. At step 1392, the gateway reactivates the server making it available for managing the specific process of the client.

This fail-over functionality allows any server within a system to be shut down without causing any interruption to mobile data communication services—provided that the same processes supported by the server being shut down are also supported by at least one other running server.

The above described fail-over functionality is not limited to servers in a multi computer server implementation but is also available in multi computer gateway implementations. A multi-computer gateway implementation is used to allow each client to use more than one gateway whenever it is attempting to establish a valid connection. This approach assures that the failure of any one gateway will not prevent mobile applications from reaching their requested Plug-In processes.

The Connection Path. Once a server has been assigned the requested process (50 in FIG. 1) by the gateway (14 in FIG. 1), the server (12 in FIG. 1) establishes a communication path 64 or channel with the client. The connection path specifies the type of connectivity that can be used by a mobile device to connect to a gateway/server to exchange data with each process—each process number that can be requested by one of the mobile business applications. More specifically, in order for a mobile business application to be able to request any given process number there first must be defined the connection path (64 in FIG. 1) through which that process number can be requested by the mobile device (2 in FIG. 1). The rules for connection paths can be configured using the manager (16 in FIG. 1). The rules or type of connectivity that may be defined for each connection path will be based on the types of network connectivity available and supported by the system on each mobile device that is being used in the system. Therefore, a mobile device having a built-in and supported GSM modem, Ethernet LAN adapter, and an 802.11 Wi-Fi radio has the ability to establish three different types of connections. Each process number defined within a plug-In, that is assigned to run on the system server, and which the client requests, has assigned to it the type of connectivity that may be used by that client when attempting to establish a connection from the mobile device associated with that client to the server to request the given plug-in process.

Figure 8:
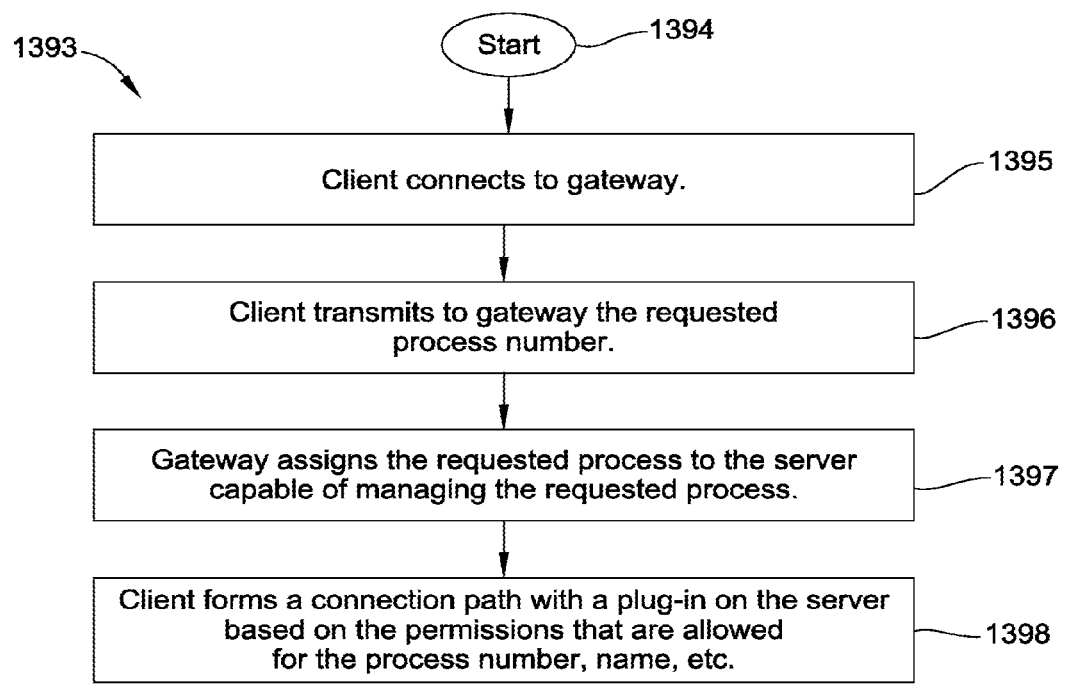
FIG. 8 shows an embodiment of a process by which a communication path or channel is established between the client and the system according to the present disclosure.

FIG. 8 shows the process 1390 by which a communication path or channel is established between the client (43 in FIG. 1) and the system (1 in FIG. 1). The process starts at step 1394. At step 1395, the client establishes a connection with the gateway (14 in FIG. 1) after initiating a session with the gateway, provided the mobile device has been properly registered with the system. At step 1396, the client transmits to the gateway the requested process number. At step 1397, the gateway assigns the requested process to the server (12 in FIG. 1) capable of managing the requested process. (see step 1034 in FIG. 2) At step 1398, client forms a connection path with a plug-in on the assigned server to manage the process requested by the client for the purpose of establishing the process requested by the client based on the permissions that are allowed for the process.

From the above description, the connection path is seen to be established from the client on the device to the plug-in process, running on a server. The plug-in process is identified by a process number (but could also be by a process name, etc.) which contains the logic to receive, interpret, transform, and respond to the data sent by the client (on behalf of the mobile business application). The plug-in process may also connect to other server-side host systems to submit data or retrieve additional data requested by the mobile business application.

Using the manager (16 in FIG. 1), it is possible to set the permissions or rules that may apply to a process. For example, the rules may define the times during which a particular connection path will be available for use by the client (43 in FIG. 1). This allows a system to define when the client will be able to establish certain types of network connections for specific plug-on processes, thereby allowing greater control over which data (based on the process number) will be exchanged over which communication infrastructure and when such an exchange of data may occur.

As another illustrative rule, it is possible to define in the manager more than one connection path to be made available for each particular process number and also set a priority for each connection path. When the manager defines multiple connection paths with different priorities for a given process, the client on the mobile device will always attempt to establish a connection for the requested process, in the defined order of connection path priority.

Figure 9:
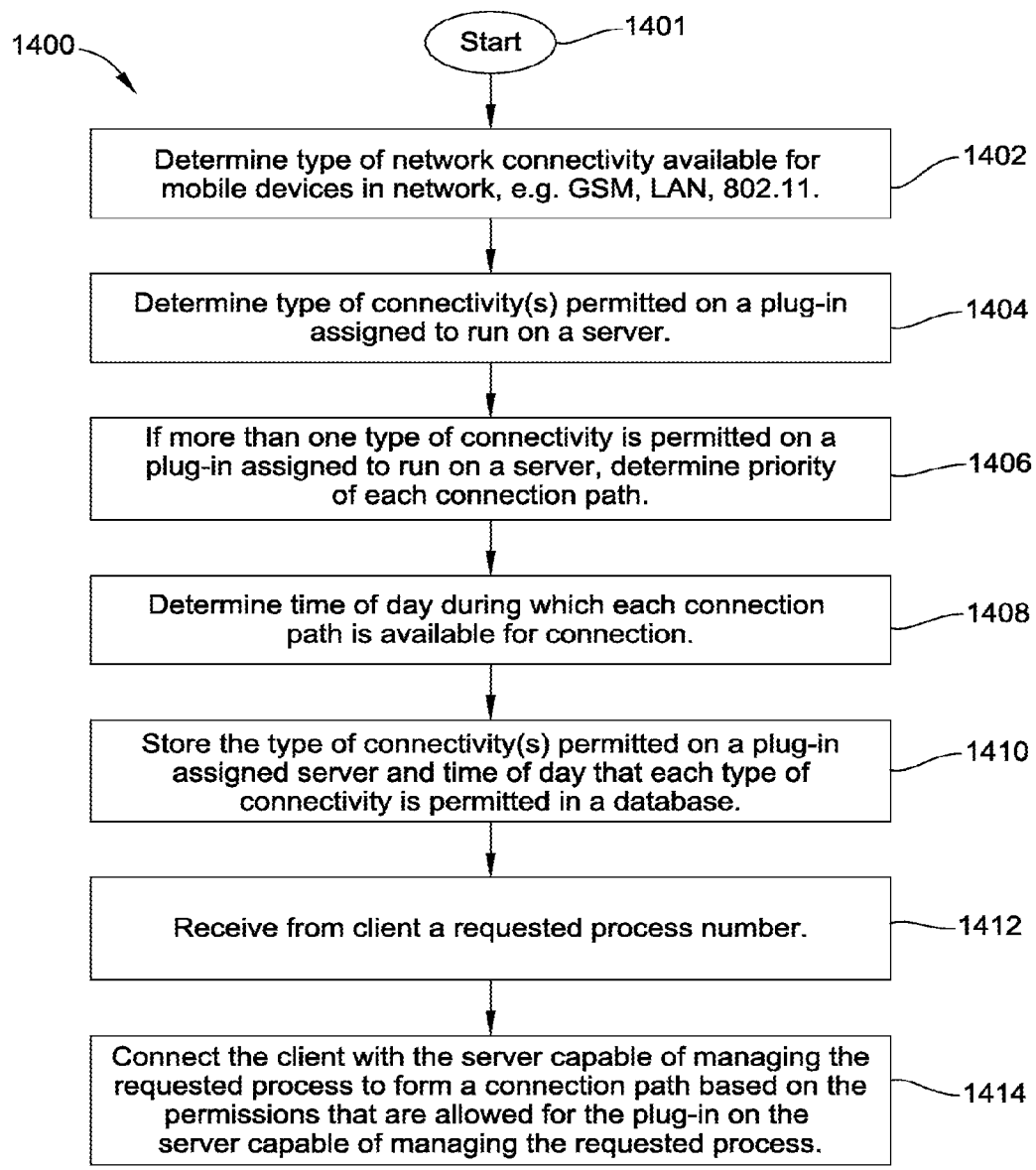
FIG. 9 shows an embodiment of a process for the assignment of a connection path to a client based on the permissions that are allowed for the requested process according to the present disclosure.

FIG. 9 shows the assignment of a connection path to a client based on the permissions that are allowed for the Plug-In (of the requested process?). The process starts at step 1401. At step 1402, the server determines the type of network connectivity available for mobile devices in the system, such as GSM, LAN, 802.11. At step 1404, the system determines the type of connectivity permitted on a plug-in assigned to run on a server. At step 1406, if the server determines that more than one type of connectivity is permitted on a plug-in assigned to run on a server, the server will determine the priority of each connection path. At step 1408, the server will determine the time of day during which each connection path is available for connection. At step 1410, the server stores the type of connectivity(s) permitted in a plug-in assigned to a server and the time of day that each type of connectivity is permitted in a database. At step 1412, the server who the gateway has assigned a process number requested by the client receives from the client the requested process number. At step 1414, the server capable of managing the requested process (which the gateway has assigned the management of the requested process) opens a communication channel with the client to form a communication path based on the permission that are allowed for the plug-in on the server.

The following is an example of a set of rules that a manager 16 may assign to a plug-in that contains the process that the client may request by a process number. In this example, the process is the downloading of a large product catalog file to a mobile device. The mobile application may request this process by process number. According to the rule defined by the manager for this process, this process should not be allowed during specific times of the day. For example, the process is not allowed between 5 am and 6 pm, during normal working hours when an organization's communication infrastructure is already strained with routine business data transfers. The rule further requires that at the off-peak times when this process is allowed, the client must follow these connection path priorities—namely, first try to connect using the LAN adapter of the mobile device if a LAN connection is available since it is the most efficient, as a second best alternative try to connect using the 802.11 Wi-Fi radio in the mobile device if a Wi-Fi access point is available, and only as a third and least desirable alternative, try to connect using the GPRS radio in the mobile device.

Figure 10:
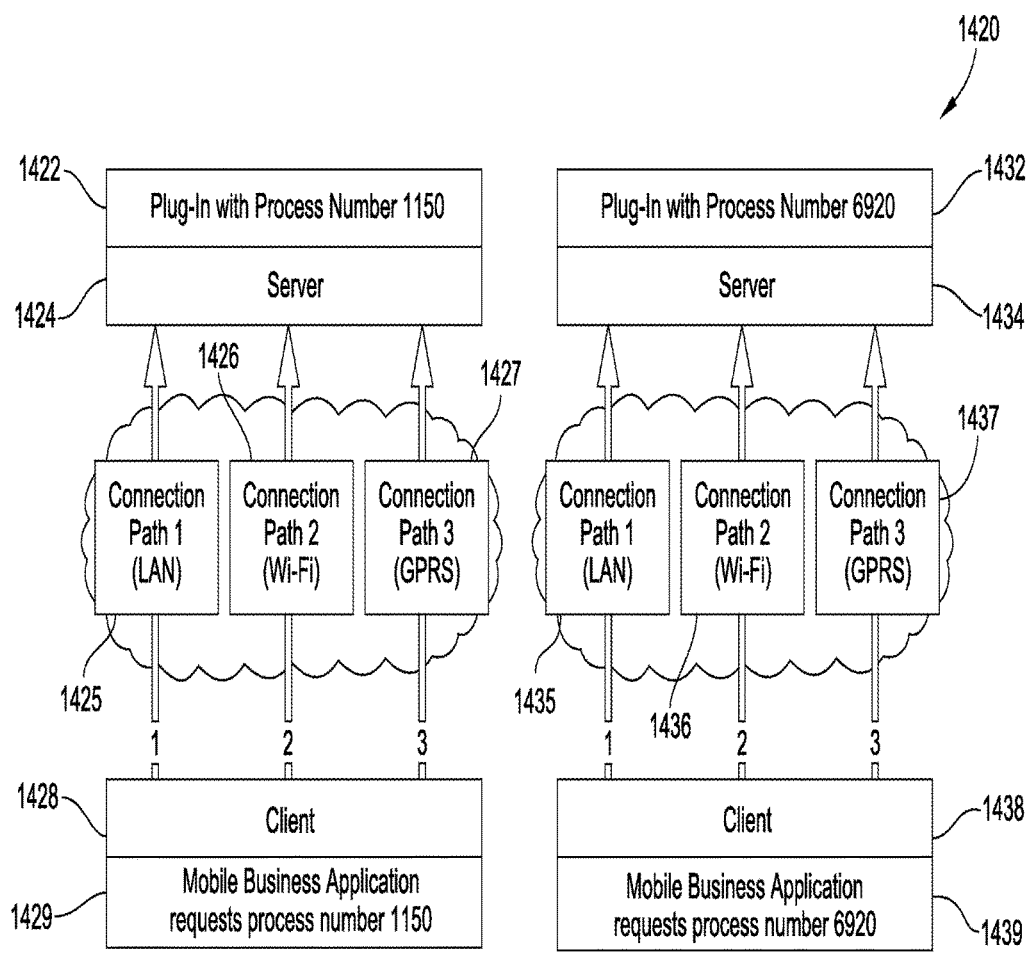

FIG. 10 shows the connection path scenarios for this example in a system 1420 that applies this rule to two plug-ins—a first plug-in with process number 1450 depicted as element 1422 and a second plug-in with process number 6920 depicted as element 1432. For the first plug-in 1422 with process number 1150, a server 1424 is enabled to open up three connection paths 1425, 1426, and 1427 for any client that requests process number 1150. Connection path 1425 is for LAN communication, 1426 is for WI-FI, and connection path 1427 is for GPRS. The connection paths may be opened up only during the off-peak hours which according to the example would be between the hours of 6 pm and 5 am. In addition, the rule requires that the connection paths be used in decreasing priority based on the above defined preferences, so that the rule would require the use of the connection path using LAN as priority 1, the one using the Wi-Fi as priority 2 and the one using GPRS as priority 3. Finally, the rule allows the process number that is used by the mobile application to request and receive the large product catalog file from the plug-in to download that catalog by way of all three connection paths.

In the example, a mobile business application 1429 has requested the process number 1150 through client 1428. As previously discussed, this request was made by an API to client 1428 after first initiating a communication session with a gateway (not shown). The gateway has assigned the management of the plug-in with this process number 1450 to server 1424 in this example. If the request of the business application 1429 is made between the hours of 5 am and 6 pm, the communication would not be possible since no connection paths are permitted to be set up by the server during these hours according to the rule. Between the hours of 6 pm and 5 am when the rule permits the server to set up connection paths for process number 1450, the server is enabled to set up either of connection paths 1425, 1426, and 1427. The specific connection path that will be set depends on the availability of LAN, WiFi and GPRS functionality to the mobile device in which the mobile business application 1429 resides. If all three are available, then connection path 1 denoted by the element number 1425 will be used by the client for the download. In other words, the assignment of process number 1450 to connection paths 1 and 2 and 3 in the manager forces the client to first attempt to establish communications for this process using a LAN network and if this is unavailable to use Wi-Fi and if that too is unavailable then to use GPRS. If only Wi-Fi and GPRS is available, then the manager will force the client to establish connections for this process using Wi-Fi, that is by path 2 denoted by element number 1426. If GPRS is the only communication means available, then the manager will force the client to establish connections for this process using GPRS, that is by connection path 3 denoted by No. 1127 to enable mobile business application 1429 to receive process 1450.

In a similar way, the specific connection path that will be set by server 1434 which is managing the plug-in with process number 6920 designated by the element number 1420 depends on the availability of LAN, Wi-Fi and GPRS functionality to the mobile device in which the mobile business application 1439 resides. If all three are available, then connection path 1 denoted by the element number 1435 will be used. If only Wi-Fi and GPRS is available, then connection path 2 denoted by element number 1436 will be used. If GPRS is the only communication means available, then the server will set up connection path 3 to enable mobile business application 1439 to receive process 6920.

As FIG. 10 shows, the foregoing rules configured the system to allow the large catalog file to be downloaded to a mobile device only during off-peak hours using all three available communication types, however forcing the client to automatically first attempt to download the file using a LAN connection, followed by a Wi-Fi connection and lastly if the prior two connection types are not available then to try to connect and download the file using GPRS. Hence, the protocol of this disclosure provides a platform for enabling the manager assignment of process numbers based on time of day, manner of connection, and other events to control mobile communication costs.

Some other events may include but not be limited to the user of the device, the geographic location of the device—GPS, etc., as well as based on device events, such as a change in device health, reaching some threshold on battery power, signal strength, etc. For example, if battery power falls under 15% shut down the GPRS radio; or if the device happens to exit a defined GPS zone then the protocol could force communications to upload all business data from the device and wipe the device clean of any data. For more on automatic triggering of data refer to Application S/N entitled "System and Process for Managing Network Communications" filed contemporaneously herewith which is incorporated herein by reference.

It is also illustrative that that the network connection path priorities are defined based on the administrator's preferences for having the data that will be exchanged as part of a requested plug-in process to be routed in some order of priority, through one of a plurality of supported network type connections (GPRS, WiFi, etc.) In addition, by excluding a supported network connection type from the list of defined connection paths, the administrator can restrict the data that is exchanged in a selected plug-in process from being transmitted through that type of network connection. For example: if the GPRS network connection type is removed from the software update plug-in process, then the client on the device will receive this information as part of the administrator defined communication rules and this restriction will not allow applications on the device to request software updates from this plug-in process, through a GPRS network connection.

Hence, from the foregoing description and description below, a connection path may be essentially a combination of a type of network connection, a plug-in process and a priority, which together with some additional properties including time, etc. can be used to control what plug-ins can be reached through what type of network connection. This information is used by the client to control what network connections it establishes and which plug-in processes can be requested through each connection.

Multiple Connection Paths.

The ability of the client (43 in FIG. 1) to efficiently handle simultaneous processing using multiple connection paths is especially important in the event that several processes are requested by the mobile application (44) at the same time or in such rapid succession that the previously requested process has not yet been completed before a new process request is generated by the mobile application. In such case, the client may take advantage of an open connection for the new process depending on certain conditions.

Figure 11:
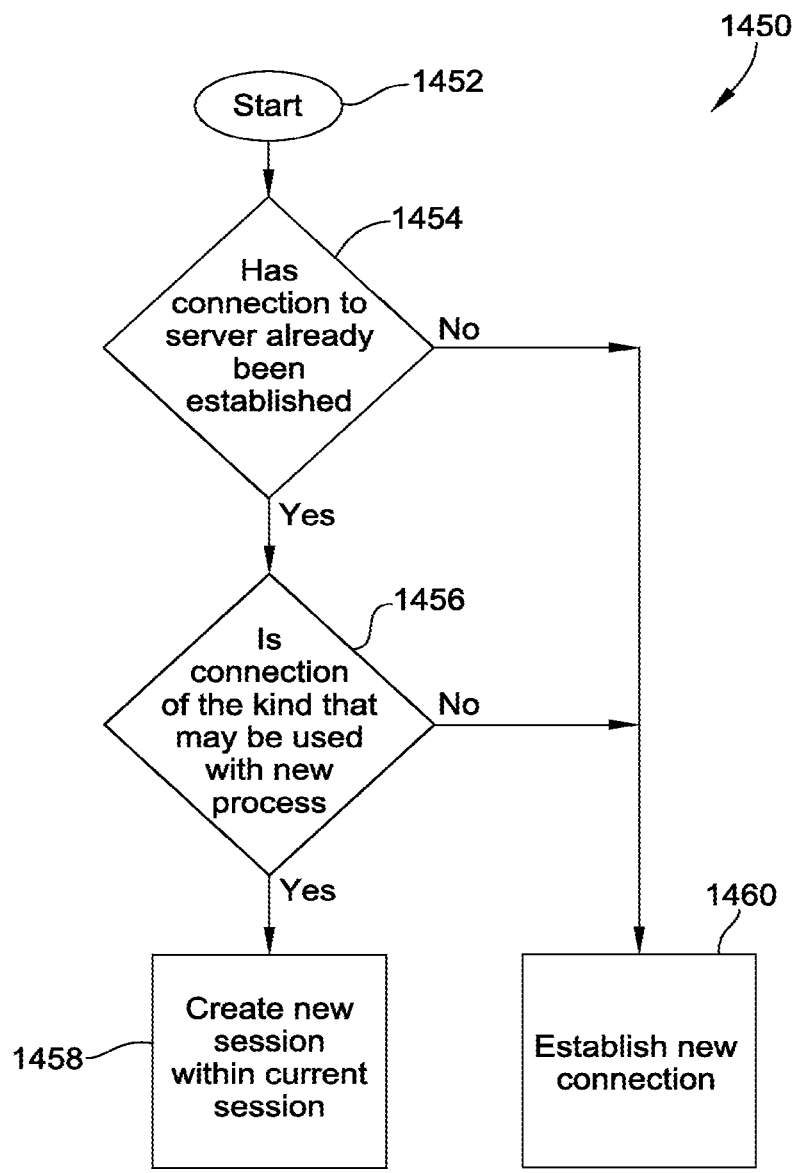
FIG. 11 shows an embodiment of a creation of a new session in an existing connection path according to the present disclosure.

Specifically, and as shown in FIG. 11, the process 1450 employed by the client starts at step 1452. At step 1454, the client determines if a connection to a server has already been established through any given connection path. If a connection has already been established then at step 1454 the client will determine if that connection path may also be used for the new process being requested by the mobile application, based on the connection type of the connection path (ignoring the connection path priorities) defined in the manager (16 in FIG. 1). If the new process (50 in FIG. 1) being requested is also set to be able to use the currently established connection, then at step 1458, ignoring all priority settings, the client will create a new session within the current connection, to handle the data exchange for this new process. However, if at step 1454, the client determines that the new process being requested is defined in the manager as a connection that is the type of connection already established the client advances to step 1458 where the client will attempt to establish a new connection to handle this process, based on the defined connection path rules. The client automatically closes each connection after all sessions within a connection have terminated.

Figure 12:
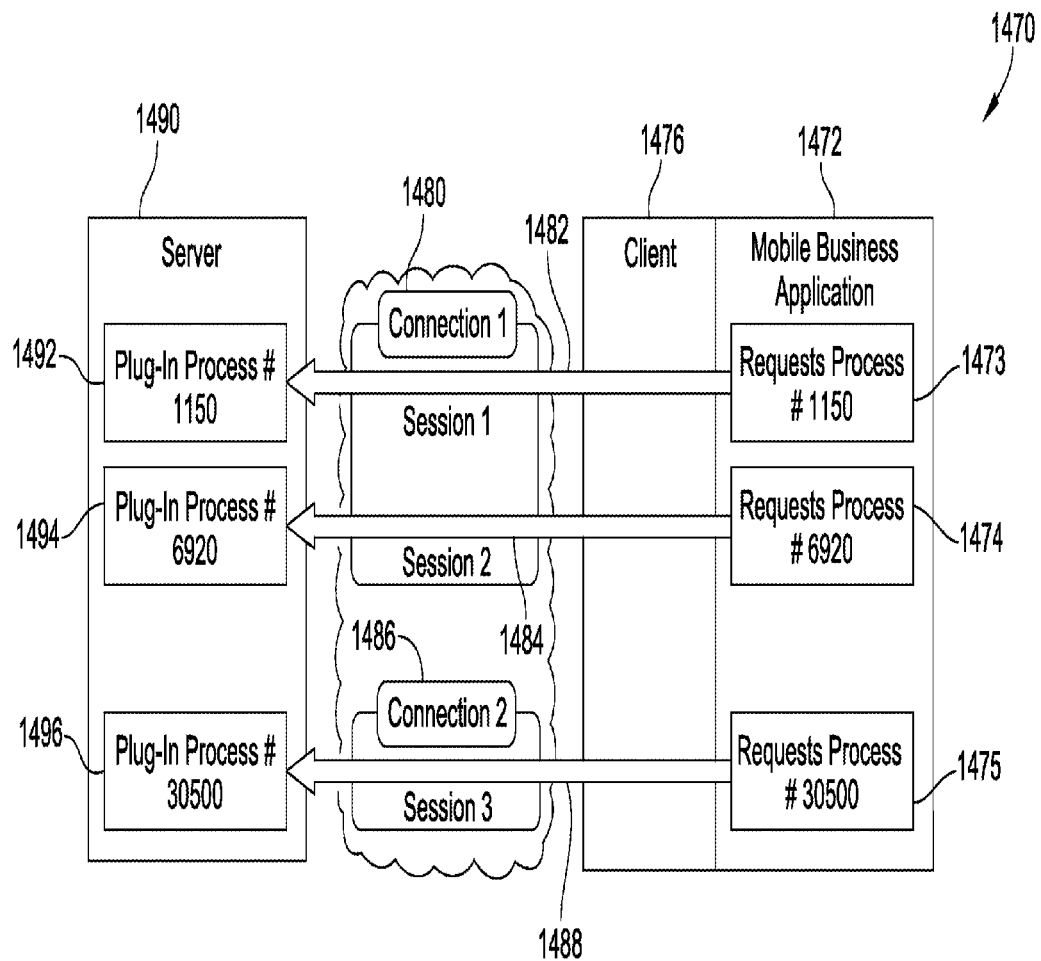
FIG. 12 shows an embodiment of a client having a business application that makes three process requests according to the present disclosure.

FIG. 12 shows a client 1470 having a business application 1472 that makes three process requests—namely, a first request for process number 1150, a second request for process number 6920, and a third request for process number 30500. At the time that process request 6920 was made by the client, a connection 1480 was already in place for processing the process request 1150 that was earlier made by the client. In this example, the new process connection 6920 is the same kind of connection as is permitted for process 1150. Hence, the client has created a new session 1484, shown as session 2, to operate simultaneously with the original session 1482, shown as session 1, in connection with an earlier request by the business application of the client for process 1150. However, the third request 1475 for process number 30500 required the client to establish a new connection 1486 since the rules prohibited process 30500 to use connection 1480. A session 1488 named as "session 3" within connection 1486 is used for the communications requested by the mobile business application 1472 by the process number 30500 request.

From the foregoing disclosure, each process that the mobile business application (44 in FIG. 1) requests via the client (43 in FIG. 1) must have a process number (50 in FIG. 1). This process number must correspond to a process number (70 in FIG. 1) that is associated with a plug-in process that is assigned to run on the server (12 in FIG. 1). Furthermore, the manager 16 can define various connection paths with different types of connectivity, even limiting the time of day when different types of connections can be established, and assign process numbers to each connection path to indicate when and through what type of connectivity each type of process may be requested by the client. For each process requested by the mobile business application the client will use the defined connection path information to automatically determine the type and priority of connections that may be established. The client knows what connection path rules have been defined in the manager because all the configuration settings, including connection path rules, defined in the manager that are to be used by the client on the mobile device, are automatically replicated to the mobile device and processed by the client each time the client attempts to connect to the system (1 in FIG. 1).

The system may also use system plug-ins (not shown) that contain special processes which are used to exchange system data (not business data) between the servers (12 in FIG. 1) and the clients (43 in FIG. 1). These system plug-in processes may have process numbers starting with 32768 and higher which illustratively may be range of process numbers reserved exclusively for use by system plug-in process).

The Structure of Communications Connections

Figure 13:
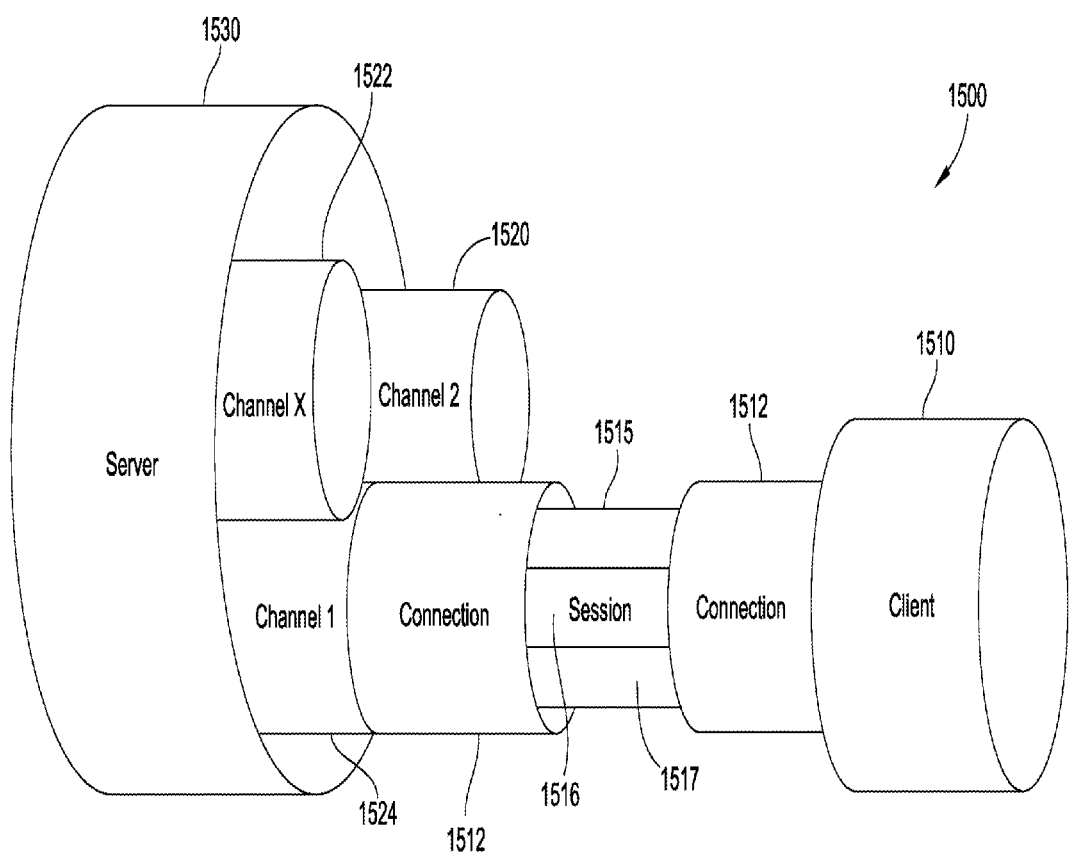
FIG. 13 shows an embodiment of a structure of communication connections according to the present disclosure.

As illustrated in FIG. 13, each client 1510 is capable of initiating one connection 1512 with one server 1530 at a time. Each connection 1512 is established using one of the system supported connectivity options that the mobile device is capable of using, such as GPRS, Wi-FI, LAN, etc. On the receiving side, each server 1530 is capable of handling many connections from many different clients at the same time. The maximum number of connections that can be handled by any given server is based primarily on the characteristics of the computer on which the server is installed and the number and complexity of plug-In processes assigned to that server. The server assigns each received connection a virtual identification number called a "Channel ID" which is used to identify that specific connection when providing information about it to a server console application (27 in FIG. 1). Therefore, a "channel" in the server console application is equivalent to a "connection" that is formed between a client and the monitored server.

Each connection is further divided into sessions 1515, 1516, 1517. Each connection may contain one or more sessions. A session is a virtual connection that is encapsulated within the physical network connection formed between a client and a server. Each connection in a system is independent from any other connection, and likewise each session is independent from any other session sharing the same connection. Sessions within a connection are created automatically by the client to handle the exchange of data between the client and the server for one specific process within a Plug-In (not shown but see 25 in FIG. 1). Each process number (50 in FIG. 1) requested by the mobile business application (44 in FIG. 1) via the client (43 in FIG. 1) will have its own dedicated session for the exchange of data. It may however share a single network connection with other sessions.

"Pull" and "Push" Data Communications

Figure 14:
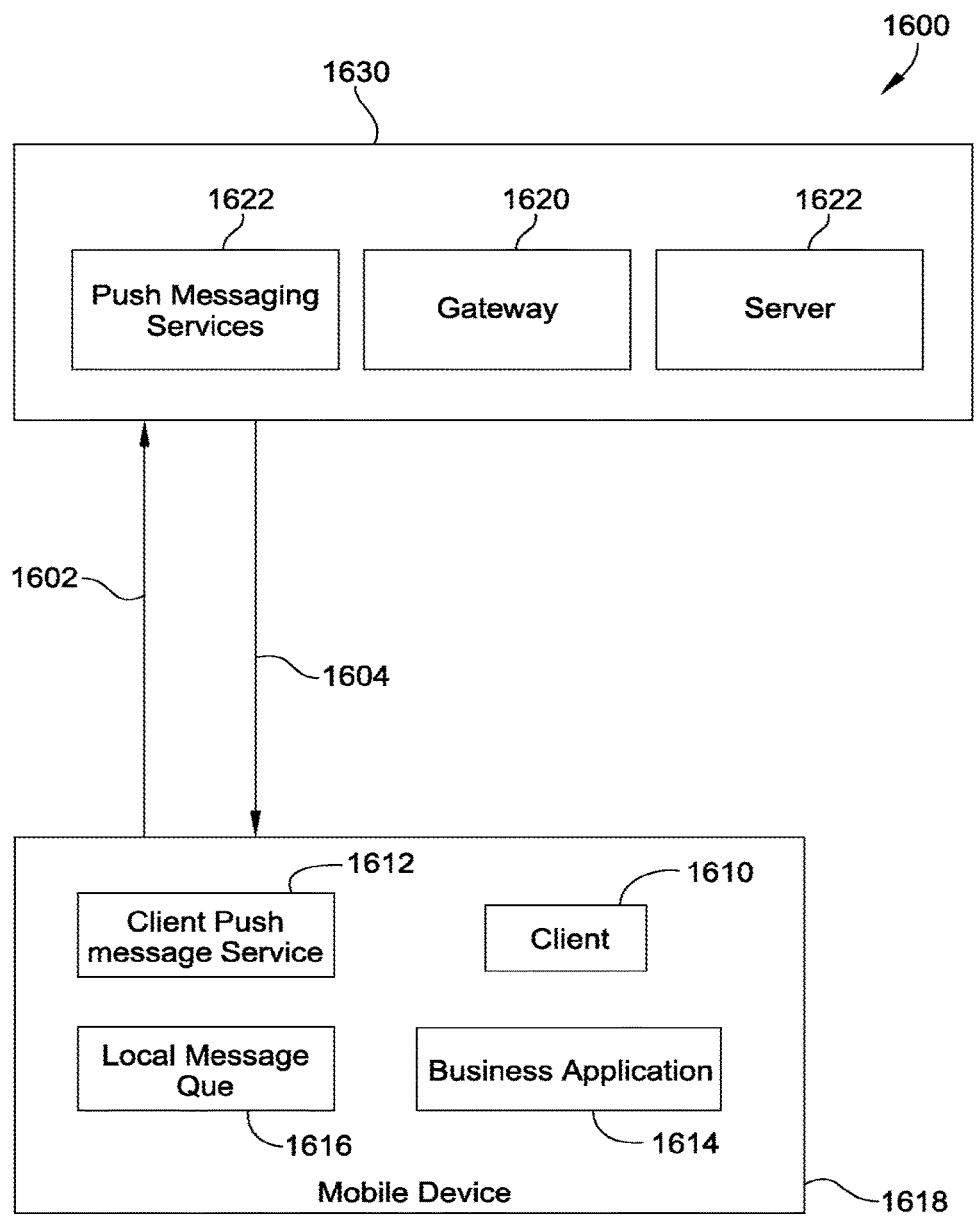
FIG. 14 shows an embodiment of a system for "pull" and "push" data communication according to the present invention.

FIG. 14 shows a system 1600 for "pull" and "push" data communication. In a pull communication scenario, communication sessions are initiated by a client 1610 on a mobile device 1618. In a push communication scenario 1604, communication sessions are initiated by a gateway 1620 (typically on demand of a host system). Push communication scenarios 1604 are supported by the system 1600 through push messaging services 1622. These services allow host systems to initiate the exchange of business data by sending messages to a mobile business application 1614 on the mobile device 1618. These messages are intercepted by a client push message service 1312 on the mobile device, stored in a local message queue 1616, and the mobile business application 1614 obtains a systems event letting it know that it can now fetch new messages from the queue. These messages can provide new business data to the mobile business application, they can encode instructions to the mobile business application (such as an instruction for it to request a specific process number which will provide it with new business data, etc.), and they can also be used to remotely launch applications on the mobile device.

Push Messaging provides the capability to send a small set of business data, on demand from a host system 1630 (for example, an ERP application, help desk and dispatch application, logistics management application) to the mobile business application 1614 running on the target mobile computing device 1618.

Push messages may contain business data that is being sent from the host system to the mobile business application running on the target mobile computing device. The system provides the software communications infrastructure to transmit and receive these push messages. The contents of each push message is determined by the needs of the host system from which the push message is originating. Host systems create push messages by inserting records into a special push message table within the Database (15 in FIG. 1). When the client push message service running on the target mobile decide receives a push message, this message is made available to the mobile business application which then interprets the message and determines what action to take. For example, depending on the contents of the data in the push message, the mobile business application may connect to the server 12 for a specific plug-in process 26; it may use the message contents to update data in its database; or it may simply display a pop-up window to the user with some instant message. In all cases however, the creation and interpretation of push message data is entirely controlled by the host system 1630 and the recipient mobile business application 1614 serves only as the secure platform through which system-wide push messages are transmitted.

Push messaging requires that the target mobile computing device is connected to the network 1630 and its IP Address is directly reachable from the gateway 1620. If the mobile computing device is connected to a network that is located behind a firewall or a network router that is using NAT (Network Address Translation) then the gateways may be unable to deliver push messages because they will be unable to locate the mobile computing device within the foreign network.

This same push messaging capability also provides the mechanism through which applications can be remotely launched on a mobile device and through which standard client communication sessions can be initiated, on demand, from the host system 1630.

Although push messaging provides a mechanism through which a standard client communication session can be initiated by the host system, this mechanism still relies on the mobile application to interpret the message contents when it is received and if appropriate, call the client to establish a connection to the server and request a specific plug-in process.

Check-Point Restart on Downloads

In the event that during the download of a file to the mobile computing device (20 in FIG. 1), the connection to the mobile computing device is dropped, for any reason, before the download can be completed, then when a connection is reestablished and the same file is requested again, the download will continue at the point of previous interruption. This is because throughout the download, the client is monitoring the progress of the file being downloaded.

Figure 15:
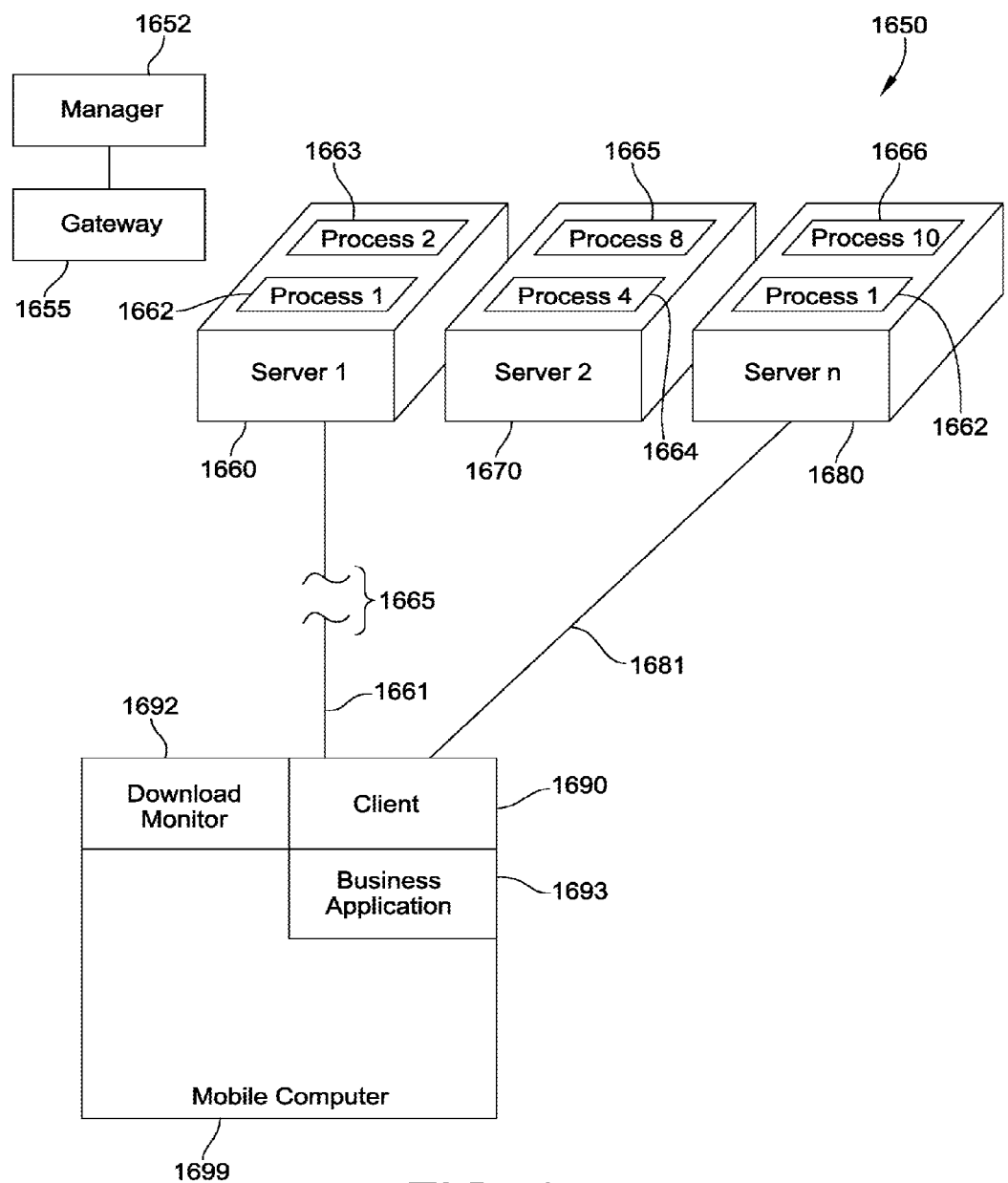
FIG. 15 shows an embodiment of a system with a check point restart on download feature according to the present invention.

FIG. 15 shows a system with a check point restart on download feature 1650 comprising a manager 1652, a gateway 1655, servers 1660, 1670, and 1680 and client 1690. Server 1660 is enabled to manage processes 1662 and 1663. Server 1670 is enabled to manage process 1664 and 1665. Server 1680 is enabled to manage process 1662 and 1666.

The system illustrates that process 1662 resides in both servers 1660 and 1680 and is manageable by both. The client has a download monitor 1692 for monitoring the download of a file to mobile computer 1699. A business application 1693 residing on mobile computer 1699 communicates with the client through a command file as previously discussed (not shown). Because process 1662 resides on both servers 1660 and 1670, the client may establish a first connection 1661 with server 1660 or a second connection 1681 with server 1680 as the channel to enable a request by the business application 1693 for the process 1650. In this illustration, the gateway has assigned the management of process 1662 to server 1660.

As previously discussed, the client will then establish a communication session with the plug-in process 1662 on the target server which allows for data to be exchanged bi-directionally between the plug-in process and the mobile application that requested the process. Based on the bi-directional exchange of data between the plug-in process and the mobile application, the mobile computer is configured with the settings provided by the plug-in in order to enable the business application to seamlessly connect and communicate with the network. In this example, the data requested by the mobile application is a source file.

When the check-point restart on downloads feature is working, system manager 1652 monitors the download of the requested source file from the process 1662 on server 1660 to the mobile computing device 1699 at the bit level. If the connection to the mobile computing device is dropped, before the download can be completed, for any reason, as shown by element 1665 in FIG. 18, the computing device may then attempt to make another request of the network for process 1662. As previously discussed, the request from the computing device will go to gateway 1655. In this example, the gateway assigns the new process request this time to server 1680 which, along with server 1660, also contains a copy of process 1662. The system manager 1652, which is notified of the assignment, will determine if the source file requested by the computing device is the same as the source file requested by the computing device before the interruption. If the source file is determined by the system manager to be the same at the bit level, the system manager 1652 will instruct process 1662 on server 1680 to start downloading the source file starting at the bit in the source file where the previous download of the source file was interrupted. In this way, the source file data downloaded by process 1662 on server 1680 will be a seamless continuation of the source file data downloaded by process 1662 on server 1660 before the interruption. The ability to quickly continue a large file download, at the point where communications were interrupted, without having to restart the file download from the beginning saves both time and money.

Figure 16:
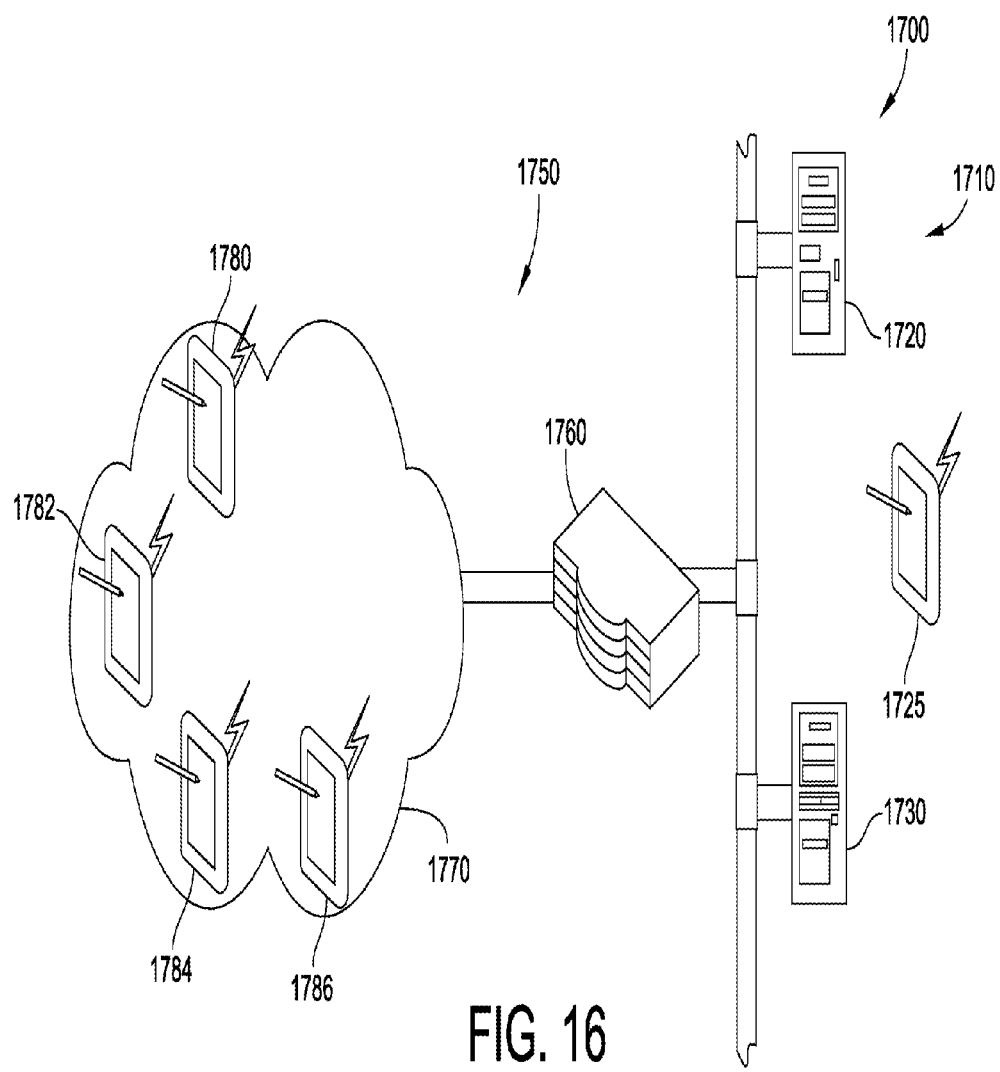
FIG. 16 shows an embodiment of a system for use in a private network and in a public network according to the present invention.

It is not necessary that the source file on the server-side be stored in the same location (such as a shared folder on a file server) to resume a file download but it is necessary that the file be identical at a binary level. The system automatically verifies that the source file, to be used to resume download, is identical to the one used during the previously attempted download. If the system determines that the file is not identical then the system will assume that the source file has changed (for example, the source file was overwritten by a new version of the file) and the file download will automatically restart at the beginning of the source file Routing Connections in Public and Private Networks FIG. 16 shows a system 1700 for use in a private network 1710 and in a public network 1750. In some network topologies it is necessary to communicate between mobile devices in a public network 1750 and system gateways 1720 and system server 1730 located within the private network 1710. Typically, between the public network 1750 and the private network 1710 there will be a router 1760 and often this router will use NAT (Network Address Translation). In order for the system 1700 to retain the advantages of its distributed architecture, it needs to be configured so that mobile computing devices can correctly locate and connect to the server-side system infrastructure when moving between a company's public and private network.

When a client 1725 connects to gateway 1720 from within the private network 1710 the gateway will forward the client to the server using the IP Address of the server as it is known within the private network as discussed above. However, if that client is connecting to a gateway from the public network 1750 then the gateway's attempt to redirect the client to the server will not work properly, because the IP Address of the server as it is known within the private network 1710 is not resolvable within the public network. Essentially the client will be unable to find the server to which it is being redirected. To solve this situation, it is possible to configure, within the manager (not shown), the client to use the Microsoft VPN Client. This will provide an additional secure tunnel layer into the private network 1710 from the mobile device. Another solution, is to use the NAT features within the system, as explained below.

The system can be easily configured to work with a router or firewall that is using NAT (Network Address Translation) 1760 between the gateways and servers installed in the LAN and the mobile devices in the WWAN.

The system 1700 supports the automatic translation of IP Addresses in network topologies where mobile computing devices connect through a public network (for example: through the Internet, a GPRS APN, etc.) and need to access gateways and servers located within a private network, behind a firewall or router, that is using NAT (Network Address Translation). Using the manager, IP Address translation can be configured uniquely for each connection path and type of connection (GPRS, Wi-Fi, LAN, etc.).

The system supports Network Address Translation at the boundary between a private network containing the gateway/server applications and a public network within which mobile computing devices are running the client. It is not possible to perform Network Address Translation between gateways and servers located in different networks. It is assumed that all gateways and servers are directly IP Addressable to each other within the private network (as they would be within a single LAN).

Service support for NAT is setup using the Network IP Address Translation tab on the in the Connection Groups module. Using this tab it is possible to define the External IP Address and Internal IP Address that will be used by each Gateway and Server in the system. Support for NAT is configured separately for each group in the Connection Groups module (see Connection Groups 2010 in FIG. 19) and individually for each type of network connectivity.

Before configuring the system to support NAT it may be helpful to consider what types of network connectivity will be used by your mobile devices and which of these types of network connectivity will require that TCP/IP packets flow through a NAT enabled router. For example, support for NAT may only be needed when the client is connecting from a mobile computing device through GPRS, that is, connecting from a public network to your private network. However, when the client is connecting from a mobile device attached to your LAN then we would not expect to use NAT because all communications would most likely be taking place within the internal network.

If all the gateways and servers are installed within the internal network and they will be accessed from a public network using a given type of network connectivity (for example: GPRS or modem dial-up through the Internet) then all gateways and servers should be configured to use NAT with this type of network connection. Failing to do this will cause the client to be unable to reach some gateways and servers. Requested processes that are forwarded to unreachable servers will return an error.

After modifying NAT configurations, clients will immediately obtain the new NAT-enabled connection path settings, however, it may take up to fifteen minutes before the new NAT configurations are automatically propagated to all the gateways and servers in the system. If it is needed to force an immediate refresh of the new NAT configurations then there should be a shutdown and restart of the gateway and server applications.

TCP/UDP Ports

Figure 17:
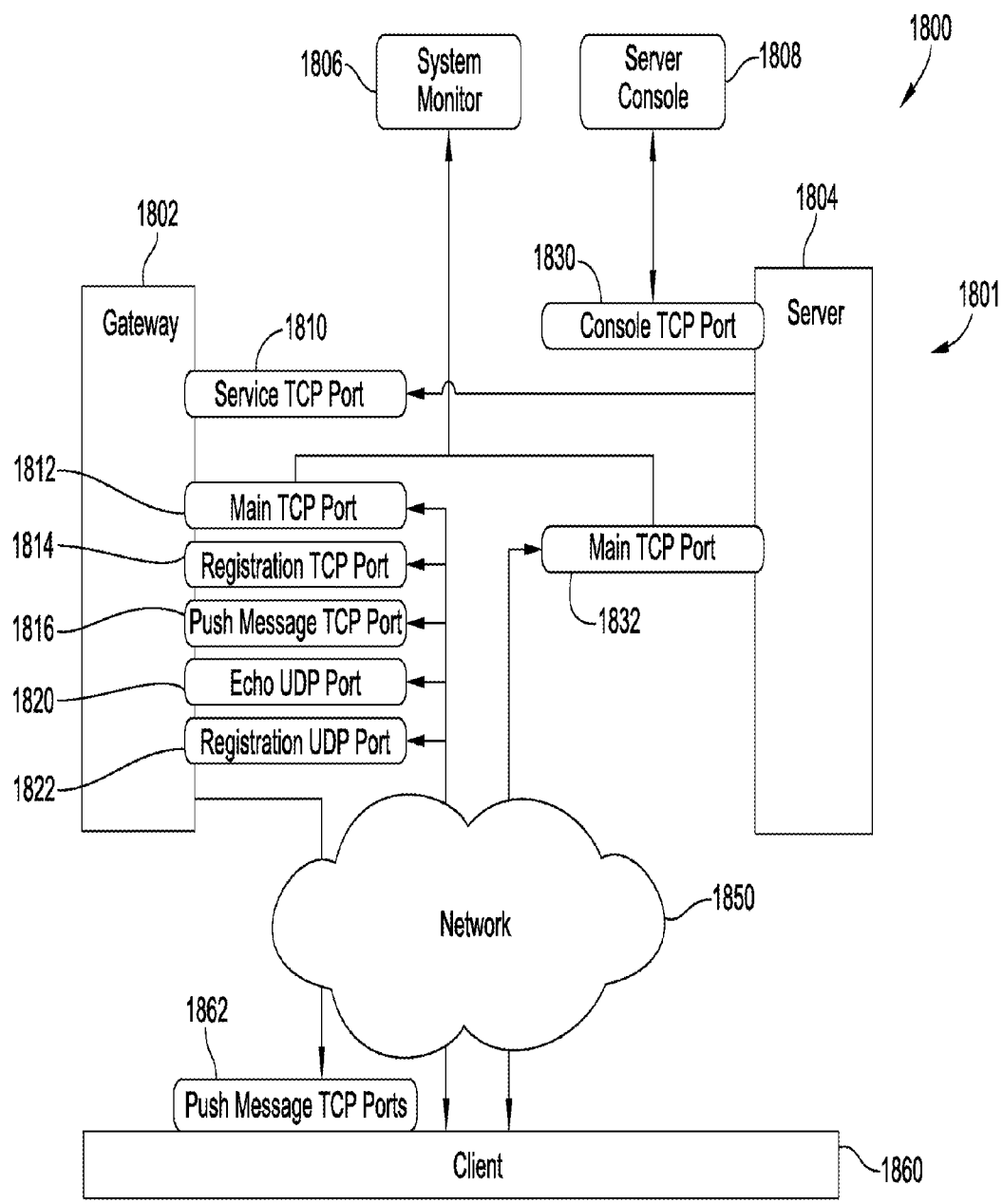
FIG. 17 shows an embodiment of the relationship between the TCP/UDP ports and the client according to the present invention.
Figure 18:
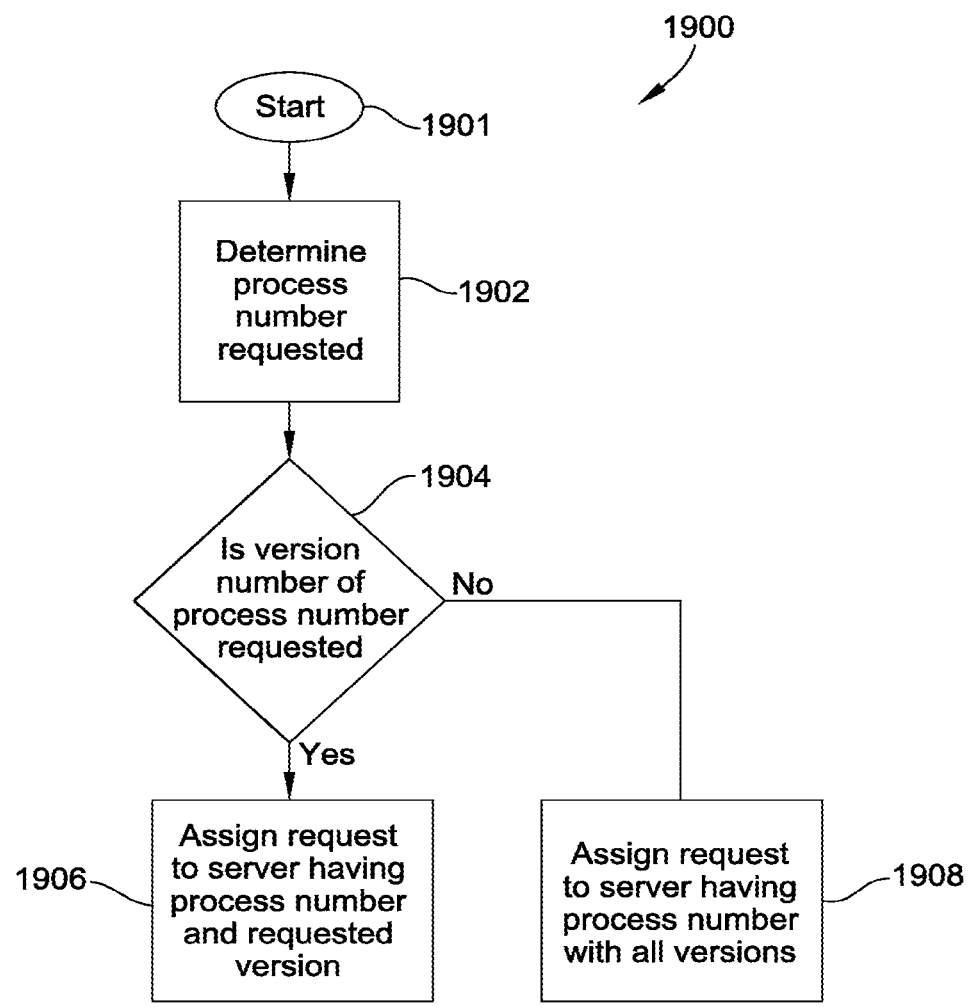
FIG. 18 shows an embodiment of a process for updating mobile applications according to the present invention.

A system 1800 uses its own range of TCP and UDP Ports for handling communications within the system. Each service within the system uses its own TCP/UDP Port and proprietary high-level protocol to provide specific data exchange services. To facilitate the implementation of system within various networks, the system allows most TCP Ports that it uses to be redefined. However, this may also be implemented in other ways including as an HTTP or HTTPS encapsulated data stream to one or more administrator defined TCP Ports. FIG. 17 shows the relationship between the TCP/UDP ports and the applications. More specifically, FIG. 17 shows the system comprising a core infrastructure 1801, a client 1860, and a network 1850 providing for communication between the core infrastructure and the client as previously discussed. The core infrastructure includes a gateway 1802, a server 1804, a monitor 1806, and a server console 1808 as also previously discussed. FIG. 18 further shows the TCP/UDP Port protocol to provide specific data exchange services.

The protocol includes on the gateway side, service TCP Port 1810, Main TCP Port 1812, Registration TCP Port 1814, Push Message TCP Port 1816, Echo UDP Port 1820, Registration UDP Port 1822. Service TCP Port 1810 is a Service TCP Port assigned Default TCP Port 50002 and is handled by each gateway. This TCP Port is used by all servers to report real-time information concerning their availability and performance. Main TCP Port 1814 Main TCP Port for Gateways/Default TCP Port 50001 handled by each gateway, this TCP Port is used by all clients to exchange authentication credentials and obtain process forwarding information to a server. This TCP Port is also used by the System Monitor to obtain information on the availability of the Gateway Registration TCP Port 1814 is a Registration TCP Port for device OEM Code assigned Default TCP Port 50003 and is handled by the gateway, this port is used to receive the OEM Code registration request from a Loader. Push Message TCP Port 1816 is a Push Message TCP Port for gateway assigned Default TCP Port 50005 and is handled by the gateway, this TCP Port is used to receive IP Address updates from the client push message service (not shown) running on the mobile device Echo UDP Port 1820 is an Echo UDP Port for Gateways assigned Default TCP Port 50001 and is handled by each gateway, this UDP Port is used by the client to send a UDP "echo" packet to all known gateways to determine which gateway provides the fastest response time. Registration UDP Port 1822. Is a Registration UDP Port for device OEM Code assigned default TCP Port 50003 and is handled by the gateway, this port is used to receive the OEM Code registration request from a loader (not shown).

On the server side, the protocol further includes Main TCP Port 1832 and Console TCP Port 1830. Main TCP Port 1832 is a Main TCP Port for Servers assigned Default TCP Port 50000 and is handled by each server, this TCP Port is used by all clients to exchange data with plug-in processes running on a server. This TCP Port is also used by the system monitor 1806 to obtain information on the availability of the server. Console TCP Port 1830 is a Console TCP Port assigned default TCP Port 50004 and is handled by each server, this TCP Port is used by the server console application 1808 to obtain real-time server processing information.

On the client side, the protocol further includes Push Message TCP Ports 1862: TCP Ports 1862 is a Push Message TCP Ports for clients assigned Default TCP Port 50000-50050 and is handled by the client, this pool of TCP ports is used by the client push message service (not shown) running on a mobile device to receive push messages from the gateway.

These ports must be opened on the firewall to permit inbound packets from mobile devices in an external network to reach gateways and servers in the internal network. It is also necessary to forward these ports to the computers running gateways and servers. The ports must also be opened on the firewall to permit outbound packets to reach mobile devices in the external network.

The Service TCP Port defined for the Gateway and the Console TCP Port defined for the Server are different. These two different TCP Ports serve entirely different purposes and it is not possible to use the server console application to also connect to and monitor a gateway through the Service TCP Port.

Updating Mobile Business Applications

Mobile business applications are designed to receive, process and output business data in accordance with the data structures and data processing rules developed for the business application. As a consequence these business applications have built-in dependencies with respect to what data they need and how that data is expected to be provided. Due to these data dependencies the process of updating mobile business applications can be complex and typically requires the coordinated execution of mobile device software updates with updates of host systems and their data integration interfaces.

The system (5 in FIG. 1) is designed to help make the entire process of updating mobile business applications easier, faster, more flexible and with less risk. One of the fundamental features that make this possible is the use of version controlled plug-in processes that are requested as needed by the mobile business application. By specifying not only the process that is being requested but also its version, the mobile business application is able to connect to and exchange business data with those processes that are compatible with its data dependencies.

FIG. 18 shows a process 1900 for updating mobile applications. The process starts at step 1901. At step 1902, a gateway determines the process number requested by a business application through a client. At step 1904, the gateway determines whether the business application has also requested a specific version of the requested process. If YES, the gateway assigns the request to the server having the process No. and the requested version. If NO, the process assigns the request to a server having the process number with all versions. The manner in which the gateway makes these assignments to the server has been previously discussed.

When the mobile business application is updated in such a way that its data dependencies change, then the mobile business application may include in the updated application logic the new version number of the process with which it is now compatible. Because each mobile business application will request only those process versions with which it is compatible, it is possible to deploy and maintain within one mobile computing system, different versions of the same mobile business application without compromising the integrity of the host system data integration interfaces.

The ability to operate multiple versions of the same mobile business application at the same time allows a user to simplify new mobile business application deployment processes, avoid tedious and costly communication synchronization planning for the update process, and also offers unique advantages in software piloting and phased software rollouts.

To assure that updated mobile business applications will have access to their required process versions, the new plug-ins should first be installed and configured and then new business applications added to the business applications module in the manager.

Defining Communication Rules

The system allows the management of communications between mobile devices and host systems by grouping system codes into connection groups. These groups are used to define the communication rules used by mobile devices to determine what type of network connection to open and which open network connection should be used to exchange different types of business data. Each system must have at least one connection group established before any mobile device communications can take place.

Figure 19:
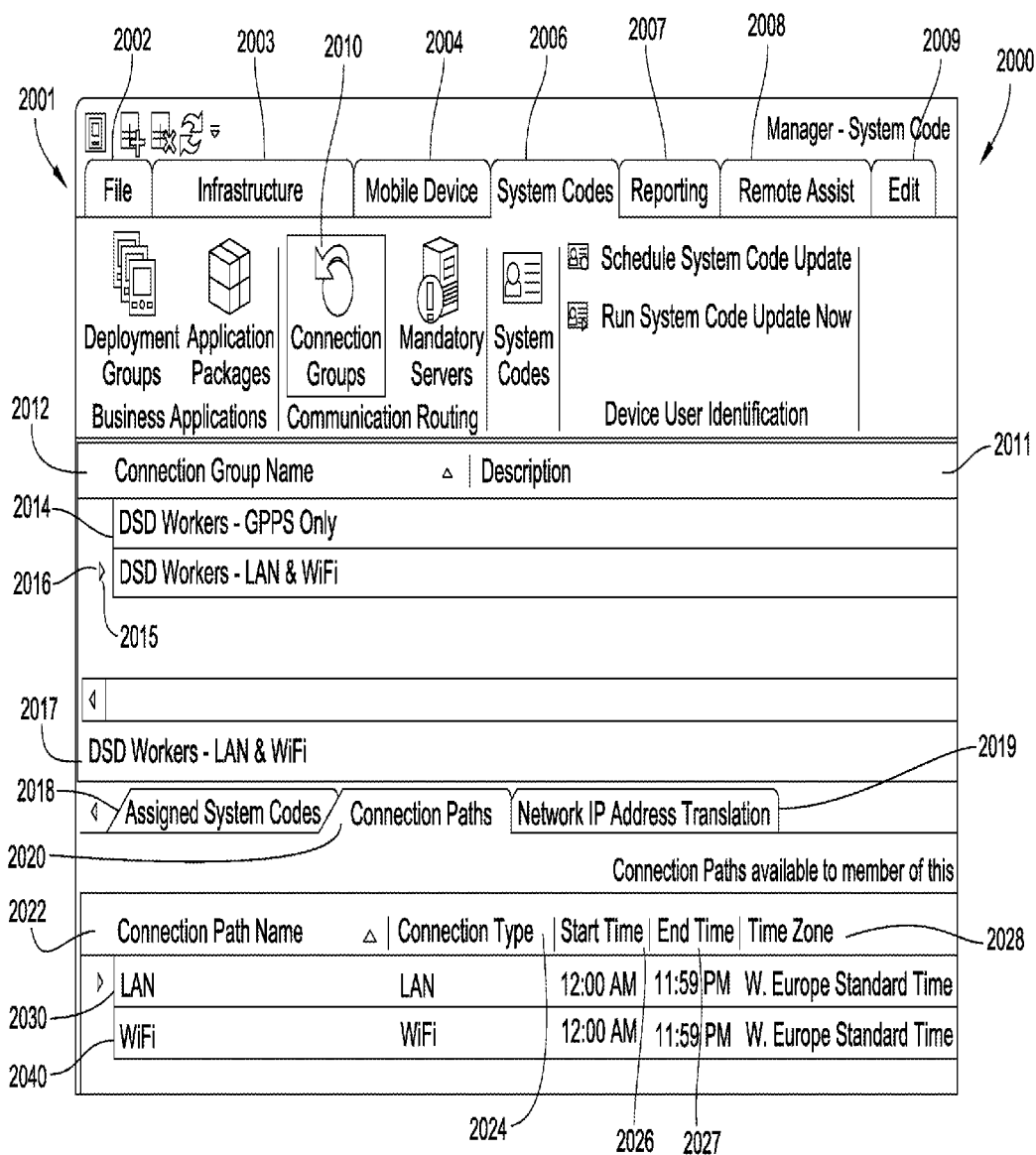
FIG. 19 shows an embodiment of a window that may appear on a display of a system manager illustrating the management of communications between mobile devices and host systems by grouping system codes into connection groups according to the present invention.

FIG. 19 shows a window 2000 that may appear on a display (not shown) of the system manager (16 in FIG. 1) illustrating the management of communications between mobile devices and host systems (1 in FIG. 1) by grouping system codes into connection groups. The window 2000 shown in FIG. 19 displays a toolbar 2001 that allows the user to display files by activating a file tab 2002, infrastructure by activating an infrastructure tab 2003, mobile devices by activating a mobile devices tab 2004, system codes by activating a system codes tab 2006, reporting by operating a reporting tab 2007, remote assist by activating a remote assist tab 2008, and edit by activation of an edit tab 2009 functions. FIG. 19 illustratively shows the display appearing after the toolbar system codes tab 2006 has been activated followed by the activation of a connection groups tab 2010. The display shows a connection group listing 2012 including a first connection group 2014 DSD Workers—GPPS Only and a second connection group 2016 DSD Workers—LAN & WiFi. The arrow 2015 indicates that the second connection group 2016 DSD Workers—LAN & WiFi has been selected for display in a window 2017 appearing inside of the window 2000. Inside window 2017 is a tab 2018 which a system manager may use to navigate through the assigned system codes 2018, a tab 2020 which a user may use to navigate through connection paths, and a tab 2019 which a user may use to navigate through network IP address translation. In this FIG., the Connection Paths tab has been selected to display a tab 2022 for connection path names, a tab 2024 for connection types, a tab 2026 for start time, a tab 2027 for end time, and a tab 2028 for time zone.

Figure 20:
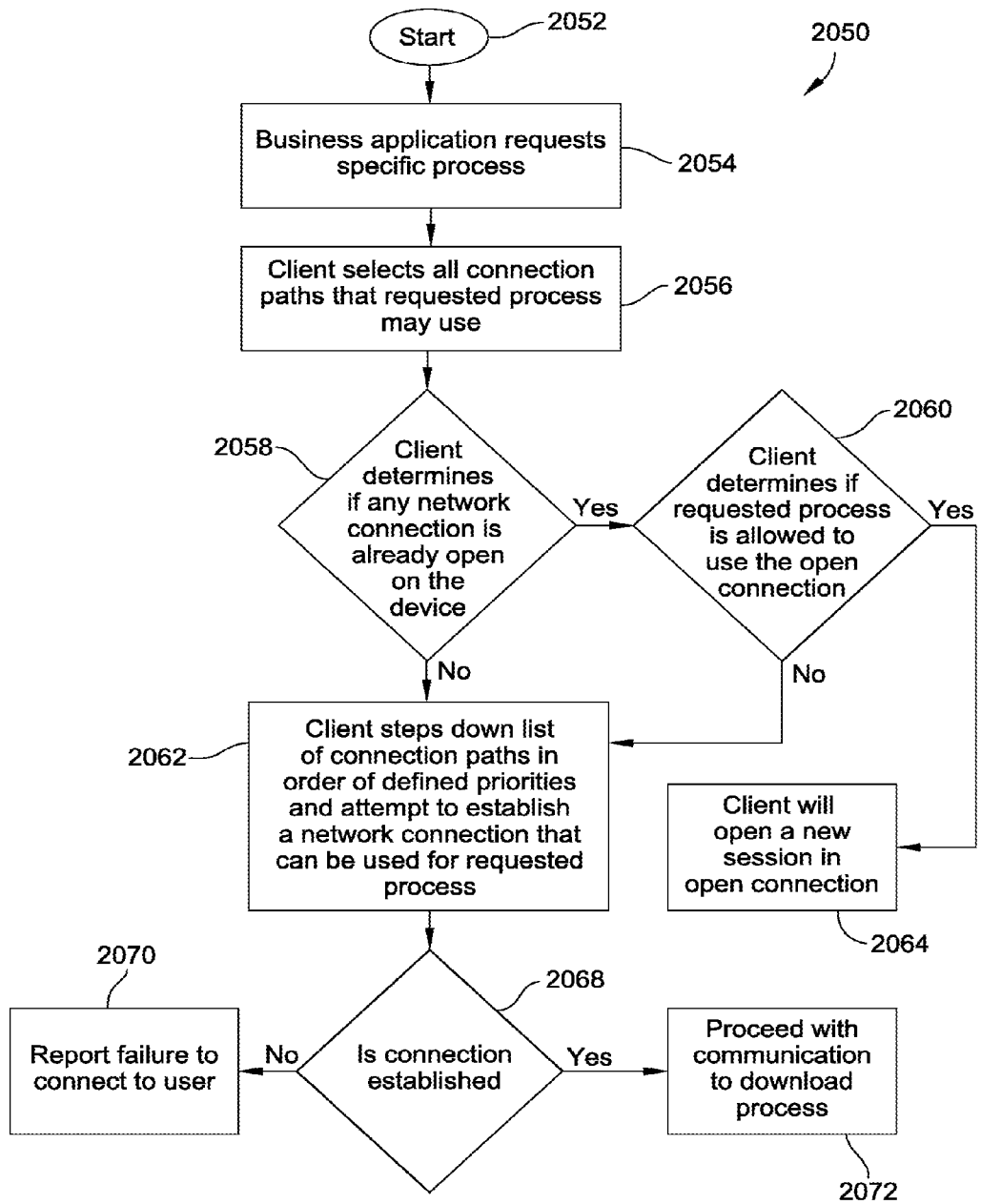
FIG. 20 shows an embodiment of a process for determining which connection path should be used according to the present invention.

As FIG. 20 shows, connection group listing 2012 includes one or more connection paths 2012 available to workers appearing on the listing. The arrow 2015 indicates that the second connection group 2016 DSD Workers—LAN & WiFi has been selected for display in the window 2017. In particular, from among different types of network connections (LAN, Wi-Fi, GPRS, CDMA, etc.) connection group 2014 which is DSD Workers are permitted to use GPRS only. These are the types of network connections that the client may open from the mobile device. On the other hand, connection group 2016 is DSD workers and they are permitted to use both LAN and WiFi.

As previously indicated, the arrow 2015 indicates that the second connection group 2016 DSD Workers—LAN & WiFi has been selected for display in the window 2017. Under the connection path name listing 2022 appears both LAN and WiFi connections that the connection group 2016 is permitted to use. As the window 2017 further shows each connection has been assigned its own set of privileges. In other words, a rule has been defined for each connection that defines when that connection may be used. To show this, the window 2017 has further listings for start time 2026, end time 2027, and time zone 2028. The LAN connection type 2030 is only permitted to be used between 12 am and 12 pm W Europe standard time. The Wi-Fi connection type 2040 is likewise limited to for use during these same times.

By creating various connection groups with different connection paths and assigned processes it is possible to establish different communication rules to meet the needs of different groups of device users. Each time a system manager modifies the parameters of a connection path or its assigned processes the user is modifying the rules that will be used by the client to manage mobile communications. Each device user will have his device provisioned with the communications rules specified by the connection group to which their submitted system code is assigned.

Automatic Selection of Connection Paths

By default, the client (43 in FIG. 1) will automatically select the connection path to use each time the mobile business application (44 in FIG. 1) requests a specific process. This automated selection process is based on the connection path rules defined by the administrator in the manager (16 in FIG. 1) as described above. By configuring communication rules centrally and using the automatic selection of connection paths from each device (20 in FIG. 1) based on the requested process, the administrator is able to establish and enforce least-cost connection routing rules that are in-line with business process objectives.

FIG. 20 shows a process 2050 for determining which connection path should be used. The process starts at step 2052. At step 2054, the business application requests a specific process. At step 2056, for each requested process, the client will select all connection paths that the requested process may use. At step 2058, the client will check to see if any network connection is already open on the device. If a connection is already open then the process advances to step 2060 where the client will check to see if the requested process is allowed to use the open network connection. If an open network connection is of the type that can be used for the requested process, at step 2064, the client will use it to open a new session in the open communication. If it is not one of the allowed types of network connections or no open network connection exists then at step 2062, the client will step down the list of connection paths, in the order of their defined priorities, and at step 2068 attempt to establish a network connection that can be used for the requested process. If no network connection can be established (for example, if the device presently has no network connectivity options available to it) then at step 2070, the client will report this event to the mobile business application as failure to connect. If a network connection can be established, then at step 2072 the client proceeds with communication over the connection to download the process.

Manual Selection of Connection Paths

In some business scenarios it may be beneficial to allow the automatic connection path selection process on the device to be overridden by the device user. In these scenarios the client (43 in FIG. 1) can always provide the mobile business application (44 in FIG. 1) with a list of all the connection paths that may be used for its requested process. The mobile business application can display this list to the device user and use the user input to select the type of network connection to use, regardless of the administrator's predefined connection path priorities.

Allowing the manual selection of connection paths typically makes most sense in cases where there exists many network connection options for each device (20 in FIG. 1), yet at any given time and location the device user knows that only one of the lower priority connection paths is feasible. In these cases the ability to jump directly to the use of that type of network connection can be faster than the automated connection path selection process which must discover the feasible connection by stepping through its connection path rules.

Figure 21:
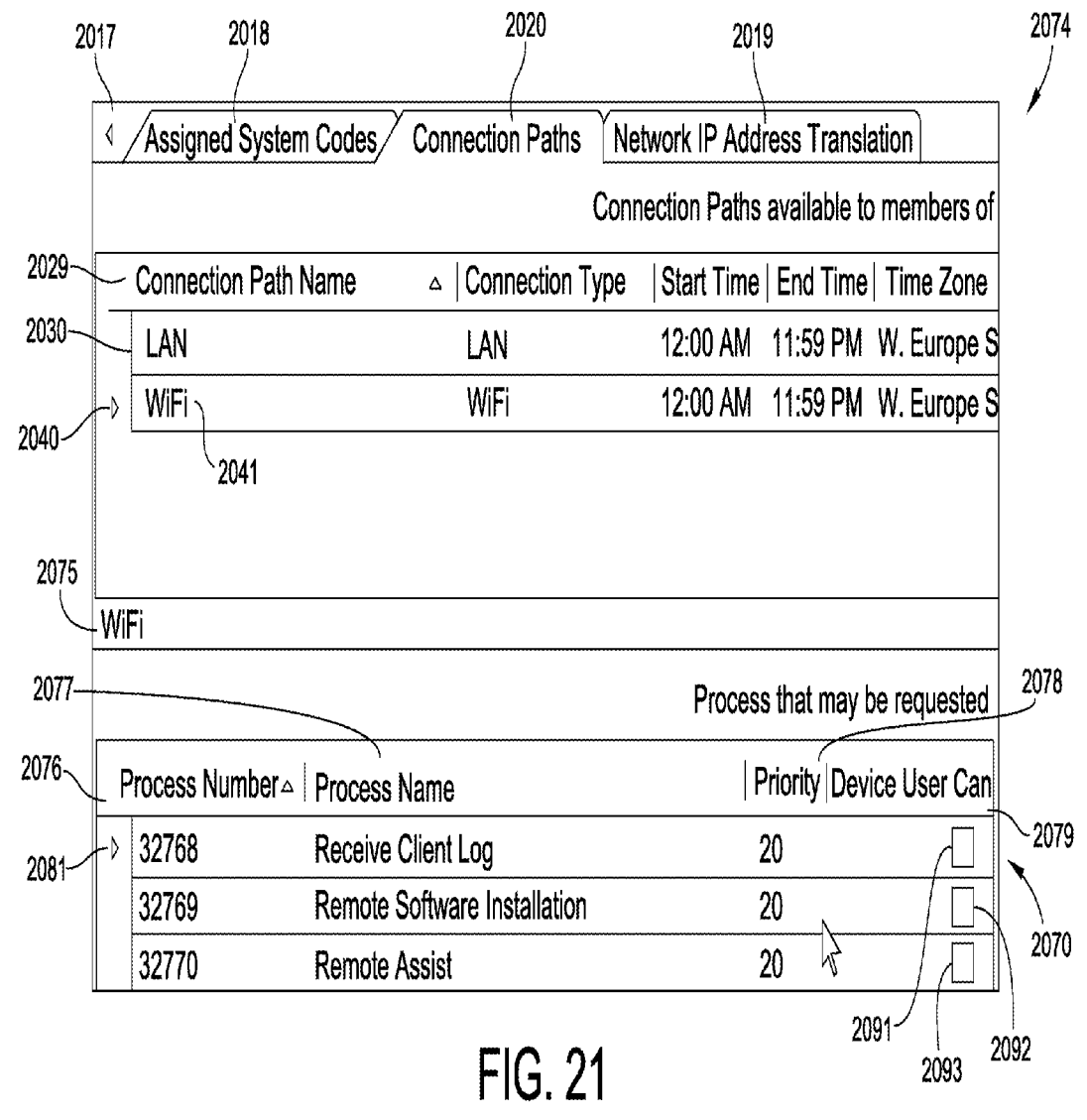

FIG. 21 shows a window 2074 that may appear on a display (not shown) of the system manager (16 in FIG. 1) illustrating the management by the system manager of communications between mobile devices and host systems (1 in FIG. 1) by connection paths. Inside window 2074 appears a window 2017 Window 2017 contains settings that may be edited by the administrator of the system (5 in FIG. 1). The arrow 2040 in FIG. 21 indicates that the Wi-Fi connection path 2041 has been selected for display in a window 2070 appearing inside of the window 2074.

Under a process number listing 2076 appears a listing of three process numbers 32768, 32769, and 32770. Under a process name listing 2077 appears a listing of three process names that are associated with the foregoing process number. More specifically, process the process name "Receive Skynax Client Log" is associated with process number 32768; the process name "Remote Software Installation" is associated with process number 32769; and the process name "Remote Assist" is associated with process number 32770. Under a priority setting 2078 appears a listing of three priority settings which are all set to priority. Under a device priority setting listing 2079 appears three priority settings 2091, 2092, 2093 associated with each of the three process numbers. Each priority setting may be checked by the manager to allow a device user to change the priority of these priority numbers. In FIG. 21, the priority settings are shown unmarked so that the window 2017 displayed on the mobile computer (20 in FIG. 1) is not editable as previously discussed. However, if any or more of these priority settings is marked, then the priority of those settings may be altered by the user at the device level. This illustrative example demonstrates the ease with which the manager may manage the network. By simple setting or unsetting of rules that have been defined for the network, the manager is able to easily add or modify rules that are applicable to mobile computers operating in the network.

Connection Path Priorities

When a process is assigned to more than one connection path, the value entered in its priority field will determine the relative order in which the client will use each connection path when the given process is requested by the mobile business application.

The number entered for the connection path priority can be any positive integer value. Lower values may have higher priority (a value of "1" is the highest priority, likewise a priority value of "50" will have higher priority than a value of "100"). When assigning processes to a connection path the manager (16 in FIG. 1) automatically pre-assigns priority values which the administrator can later modify. The manager increments the priority value each time a process is assigned to an additional connection path thereby giving that connection path the lowest priority in the list of connection paths that may be used for the selected process. Thus, assigning processes to connection paths in the order that they are intended to be used by the client may allow the manager to quickly complete the setup of connection paths.

To allow easy changes to be made in connection path priorities, the manager may use non-consecutive priority values (for example, avoid using 1, 2, 3, 4 . . . or 20, 21, 22 . . . ). By using with reasonable increments (for example, 10, 20, 30, 40 . . . ) the administrator will have the future flexibility of entering a new priority for a new connection path such that it can logically come between two existing connection path priority values, without having to first modify the priorities of existing connection paths.

Each process, identified by its unique process number, has its own priority numbering sequence across all connection paths. For this reason it is possible to see two different processes assigned to the same connection path, having the same priority value. The priority value is therefore significant for each process across all connection paths to which it is assigned but it has no meaning relative to the other processes assigned to any one connection path.

The manager enforces the rule that no two connection paths can have assigned to them a process with the same priority value (such a condition would otherwise result in an ambiguous connection path selection priority for the client and is therefore not allowed). This will however, not prevent the manager from assigning the same process to two or more connection paths using different priorities and/or overlapping valid time periods for their use.

Assigning Processes to Connection Paths

Every process that can be requested from the mobile computer (20 in FIG. 10 must be assigned to a connection path (64 in FIG. 1). All processes not assigned to a connection path will be unreachable. Therefore, a process must be assigned to a server (12 in FIG. 1), its respective plug-in (26 in FIG. 1) properties must be configured appropriately and the process must be assigned to a connection path in order for that process to be callable from the mobile computer (20 in FIG. 1). The connection path to which the process is assigned must be one of the types of network connections that are supported by the mobile computer from which the process may be requested. (For example, if the process is assigned to a GPRS based connection path then the user's device must have a supported GPRS adapter, otherwise the client (43 in FIG. 1) will determine that no connection path is presently available for the requested process.)

Figure 22:
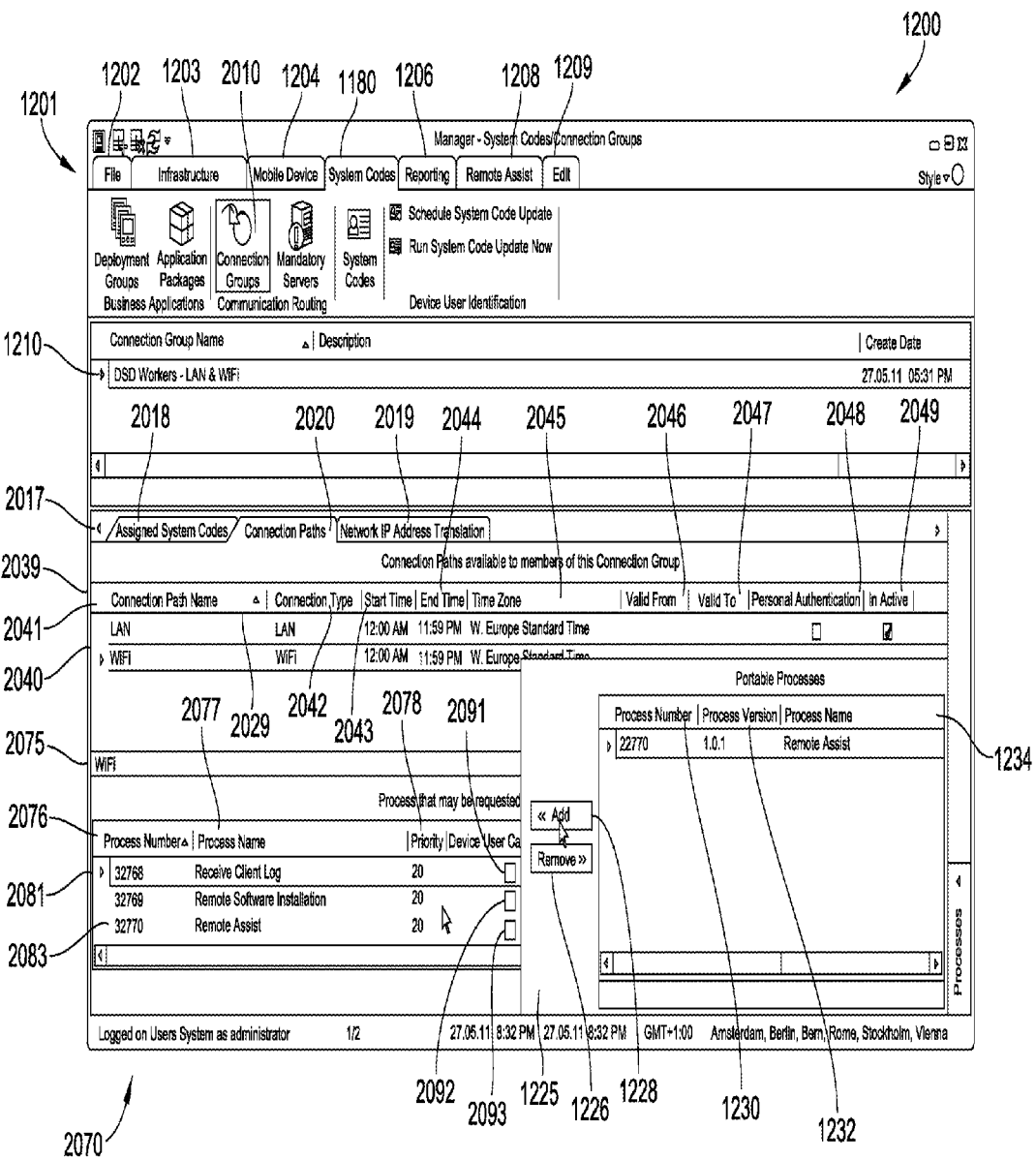
FIG. 22 shows an embodiment of the assignment of processes to connections according to the present invention.

The assignment of processes to connections by a manager (16 in FIG. 1) is shown in FIG. 22. FIG. 22 shows a window 1200 which displays a toolbar 1201 that allows the system manager to display files using tab 1201, infrastructure using tab 1203, mobile devices under tab 1204, system codes under tab 1180, reporting under tab 1206, remote assist functions under tab 1208, and edit functions under tab 1209. In FIG. 22, the tool bar 1180 for system codes is activated along with tab 2020 to show connection paths. A window 2017 is displayed having a tab 2041 for connection path name, a tab 2042 for connection type, a tab 2043 for start time, a tab for end time 2044, a tab 245 for time zone, a tab 2046 for start time for validity, a tab 2047 for end time for validity, a tab 2048 for external authentication, and a tab 2049 indicating whether the rule is active. Window 2017 in FIG. 22 is in some respects similar to the window 2017 shown in FIG. 19 with two main differences. First, the window 2017 in FIG. 22 is displayed at the system manager (16 in FIG. 1) whereas the window 2017 in FIG. 19 is displayed at the mobile computer. Second, as a system manager-level window, window 2017 contains settings that may be edited by the administrator of the system (5 in FIG. 1) unlike the illustrated window 2017 in FIG. 19 which is readable only. Some of the settings that window 2017 in FIG. 22 provides the manager (16 in FIG. 1) include settings start time (tab 2046), end time (2047), authentication (tab 2048), and indication of the rule being active (tab 2049). In FIG. 22, activity tab 2049 is shown set for "active" which is why connection paths LAN 2039 and WiFi 2040 appear on the display 2000 of the mobile computer (20 in FIG. 1) for the client (43 in FIG. 1) to manage. As previously discussed in FIG. 21, the tabs 2091, 2092, and 2093 appearing in window 2075 provide settings for the manager to use in allowing a user to change the priority of a process level at the client level. In addition, a pop-up window 1225 that was activated by clicking on process number 2083 shows buttons 1226 and 1228 for adding and removing, respectively, process numbers to the system (5 in FIG. 1). These are but a few illustrate of many rules that the manager has available to him from the disclosed system for the purpose of managing the operation of mobile computers (20 in FIG. 1) in computing system (5 in FIG. 1).

When the manager performs an initial configuration of connection paths in a new system, it is preferable to begin by assigning all processes to all connection paths. Using this approach assures that all processes are callable through all network connections which will facilitate the initial testing and piloting of the system (5 in FIG. 10. After confirming that everything is working correctly, the administrator can begin to remove from each connection path only those processes that the administrator explicitly want to exclude from using the selected type of network connection.

Each mobile computer 20 obtains only those communication rules that are relevant to the connection group of which its submitted system code is a member. Therefore, if a user enters a new system code on his device, and this System Code belongs to a different connection group with different communication rules, those rules are unknown to the client (43 in FIG. 1) and cannot be applied until they are updated on the device. These rules will be updated on the device the first time the client connects to the server (12 in FIG. 1). Therefore, if device users belonging to different connection groups may swap devices without requiring any communications before starting their work, it is advisable to assign all processes used by each connection group to the other group as well, thereby assuring that both mobile business applications will be able to call their required processes regardless of the present device user.

Communication Rules Taking Effect

Figure 23:
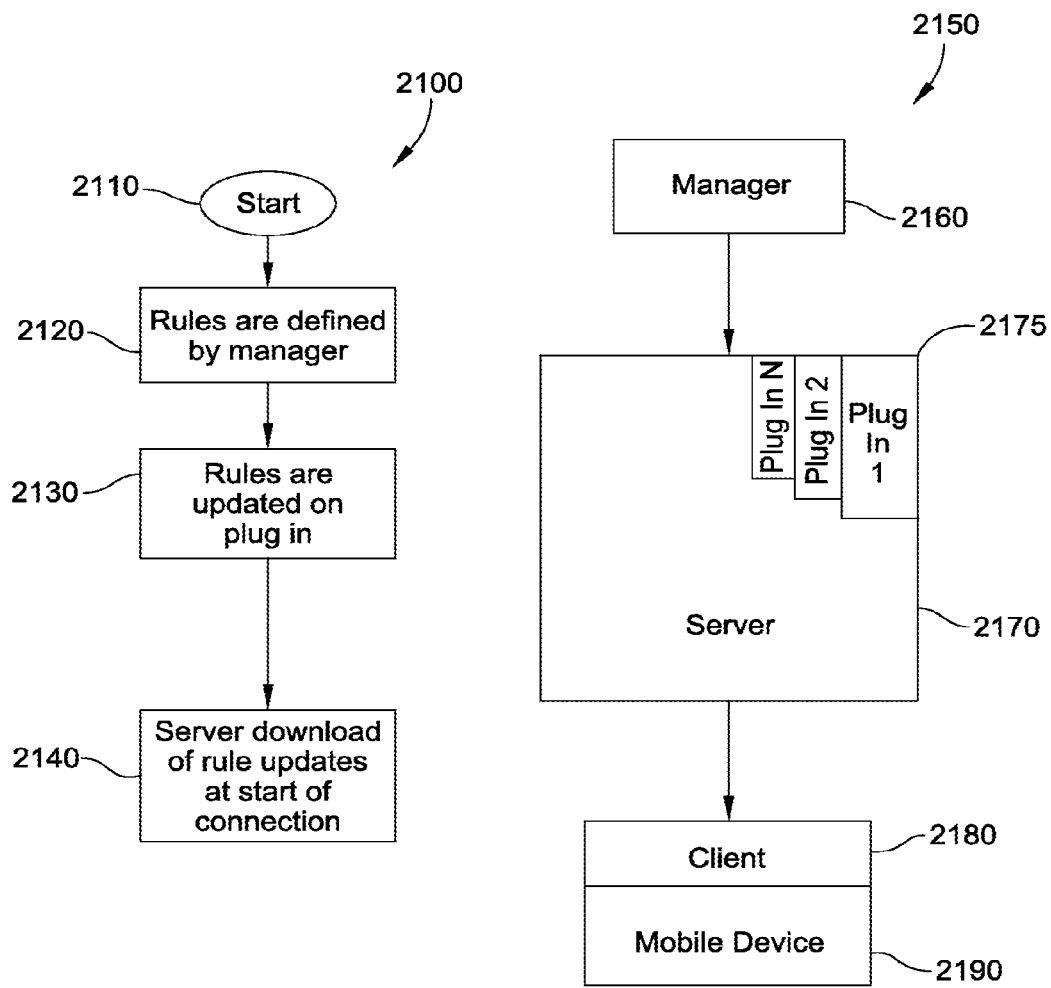
FIG. 23 shows an embodiment of a functional diagram and a process for updating connection rules onto a client according to the present invention.

FIG. 23 shows a functional diagram 2150 and a process 2100 for updating connection rules on a client 2180. The communication rules are defined centrally in the manager 2160 and must be updated on a mobile device 2180 before the client on that device can interpret these rules and modify its communication management behavior accordingly. The updates to the rules that are made by the manager appear in the plug ins 2175 residing on a server 2170. Communication rules are automatically updated on the device 2190 as needed, by a system plug-in, each time the client connects to a server 2170. According to the process 2100, at step 2120 the manager defines the rules. At step 2130, the rules are uploaded on the mobile device for use by the client. In step 2140, the server downloads the updates at the start of a connection between a client and the servers. In this process, each device obtains those communication rules that relate to the connection group of which the submitted System Code is a member.

A Summary of Connection Path Processing

One summary of an illustrative connection path processing according to this disclosure may be found by referring back to FIG. 10 which shows the connection path scenarios for an example in a system that applies predetermined rules to two plug-ins—a first plug-in with process number 1450 depicted as element 1422 and a second plug-in with process number 6920 depicted as element 1432.

As FIG. 10 shows, the foregoing rules configured the system to allow the large catalog file to be downloaded to a mobile device only during off-peak hours using all three available communication types, however forcing the client to automatically first attempt to download the file using a LAN connection, followed by a Wi-Fi connection and lastly if the prior two connection types are not available then to try to connect and download the file using GPRS. Hence, the protocol of this disclosure provides a platform for enabling the manager assignment of process numbers based on time of day, manner of connection, and other events to control mobile communication costs; resulting in greater efficiencies and network management.

Some other events may include but not be limited to the user of the device, the geographic location of the device—GPS, etc., as well as based on device events, such as a change in device health, reaching some threshold on battery power, signal strength, etc. For example, if battery power falls under 15% shut down the GPRS radio; or if the device happens to exit a defined GPS zone then the protocol could force communications to upload all business data from the device and wipe the device clean of any data.

System Plug-in Processes and Connection Paths

All process numbers starting with a specified process number, such as 32768, and higher may be reserved for use by plug-in processes of the system (5 in FIG. 1). These special processes are used to manage the exchange of configuration, status and operating information between the clients (43 in FIG. 1) and the servers (12 in FIG. 1). They do not handle the exchange of any business data.

In the reserved process number range, the process numbers 32768 to 65535 inclusive, for example, are illustrative system plug-in processes that may be assigned/unassigned to selected connection paths. Processes with a process number starting with 65536 and higher are System Plug-In process that m a y be automatically assigned to all connection paths; they can't be unassigned by the administrator) and their properties are also automatically configured (i.e., the properties used by these processes are not modifiable).

Some system plug-in processes may be unassigned from selected connection paths to allow the administrator to optimize specific communication scenarios. For example, by removing from a GPRS based connection path the System Plug-In process that handles the deployment of new business applications to devices, the administrator can prevent large application updates from taking place over GPRS, and instead allow them to be handled over other lower-cost, higher bandwidth network connections (such as LAN or Wi-Fi).

System plug-in processes perform key functions in the system (5 in FIG. 1) and for this reason they are automatically assigned to all new connection paths by default. It is desirable to assign the system plug-in processes to all connection paths, unless determined in specific communications scenarios that a given process negatively impacts communications performance or communications costs, and that this process can be unassigned from the selected connection path without causing other problems.

Mobile Business Applications

The communication protocol and system disclosed enables network communications between the data service (41 in FIG. 1) residing on the client (43 in FIG. 1) that provides network communications between a plurality of mobile applications (44 in FIG. 1) on the mobile computer (20 in FIG. 1) and the network (1 in FIG. 1) for the process number (50 in FIG. 1). The shared data service process takes care of details such as initiating network communications, opening a network connection to a gateway server, determining the server with which it will communicate, etc. The network takes care of managing each data service process in the network and the process numbers requested by the business applications through the shared data service.

In one example, the plug-in detector generates a control signal responsive to an instruction code of a variable-length instruction set. The instruction code comprises a source address field, a destination address field, and a field for identifiying a process number for configuring a data service residing on a client on a mobile computer that provides network communications between one or more mobile applications on the mobile computer and a network.

In another, the protocol and method includes a message having a source address field, a destination address field, and a field for identifying a process number for configuring a data service residing on a client on a mobile computer that provides network communications between one or more mobile applications on the mobile computer and a network.

In another embodiment, the protocol, method, and system assigns network communications between a plurality of mobile applications on mobile computing device and a plug-in through a shared data service from a gateway to a server based on the capability of managing the requested process. In some embodiments, the protocol, method, and system triggers active fail-over to inactivate one or more servers that may manage the requested plug-in process from the business applications through the shared service that have not responded to a poll and reactive the non-responding polls on notifications. In some embodiments, the disclosure provides a protocol, method, and system for establishing network communications between a plurality of mobile applications on a mobile computing device and a plug-in based on permissions that are allowed for the requested process.

In some embodiments, the protocol, method and system provides type of connection, time of day, and other permissions for establishing network communications between a plurality of mobile applications on a mobile computing device and a plug-in.

In some embodiments, the protocol, method, and system provides for new communication session to be created within already established connection for simultaneous processing with a communication session already occurring in said already established connection.

The plug-in detector, protocol, method, and system disclosed enables improved mobile communication flexibility and reliability, enhanced data transmission security, better mobile device management and mobile application support, extensive control over mobile data exchange transactions, comprehensive monitoring of all communications and data processing. The protocol provides for an open, flexible, secure and extensible platform to manage large numbers of mobile computing devices over a heterogeneous communications network. The protocol provides a standard software platform (non-customized but open to organizational specific extensions) which can be used in all mobile computing system implementations.

The plug-in detector, protocol, method, and system enables a reliable and highly scalable mobile communications system. This protocol enables a system integrated with security, data management, device management, and extensible business application support features that organizations need to effectively deploy and manage mobile computing systems. The protocol makes possible the use of a flexible, configurable, and scalable architecture that allows organizations to configure and operate the system according to the size and complexity of their information technology (IT) environment and business requirements.

The plug-in detector, protocol, method, and system enables an open, flexible, secure and extensible platform to manage large numbers of mobile computing devices over a heterogeneous communications network. This is achieved by, among other things, allowing the specifics and peculiarities of various mobile devices, networks, and information technology infrastructures. The abstraction is used with respect to specific mobile business applications, and allows the system to achieve the goal of providing a standard software platform (non-customized but open to organizational specific extensions) which can be used in a variety of mobile computing system implementations.

It will be apparent to those skilled in the art that various modifications and variations can be made to the disclosed system and method. Other embodiments will be apparent to those skilled in the art from the consideration of the specification and practice of the disclosed system and method. It is intended that the specification and examples be considered as exemplary only, with a true scope being indicated by the following claims and their equivalents.

The invention claimed is:

1. A system, comprising:
   a gateway comprising a database stored on a non-transitory computer readable medium, the database aggregating plug-in data for plug-in programs available from a plurality of servers;
   a plug-in detector executable by software stored on the gateway in the non-transitory computer readable medium, wherein the plug-in detector generates a control signal responsive to an instruction code of a variable-length instruction set, the instruction code comprising:
   a source address field;
   a destination address field; and
   a field for identifying a process number stored in the database and correlated to at least one server from the plurality of servers;
   wherein the instruction code configures a data service residing on a client on a mobile computer that provides network communications between one or more mobile applications on the mobile computer and a network; and
   wherein the control signal establishes a network connection path between the client and one of the plug-in programs on a server from the plurality of servers corresponding to the process number in the database.

2. The system of claim 1, wherein the process number is associated with a set of one or more predetermined rules for establishing communications between one or more mobile applications on a mobile computer and the network.

3. The system of claim 1, wherein the one or more mobile applications support data transfers of business or personal data.

4. The system of claim 1, wherein the process number is associated with a set of one or more predetermined rules for establishing communications between the one or more mobile applications on a mobile computer and the network using the plug-in.

5. The system of claim 4, wherein the set of one or more predetermined rules for establishing communications between the one or more mobile applications on a mobile computer and the network using the plug-in is defined by a network manager.

6. The system of claim 4, wherein the rules associated with the process number identified in the process number field of the provided message comprise a set of rules for configuring the data service to establish a connection between the one or more mobile applications on the client on the mobile computer and the network based upon the set of rules.

7. A method, comprising:
   providing a network gateway with a message comprising a source address field, a destination address field, and a field for identifying a process number for configuring a data service residing on a client on a mobile computer that provides network communications between one or more mobile applications on the mobile computer and a network;
   assigning a process to a server selected from among a plurality of servers, the server selected at least in part from a database stored on a non-transitory computer readable medium in the gateway, the database aggregating process numbers correlated to processes available from one or more servers among the plurality of servers; and
   establishing a network connection between the client and the selected server, the process being stored within the selected server's non-transitory computer readable media.

8. The method of claim 7, wherein the process number identifies a plug-in to manage a data communication between the one or more mobile applications on the mobile computer and the plug-in.

9. The method of claim 8, comprising associating with the process number a set of one or more predetermined rules for establishing communications between the one or more mobile applications on a mobile computer and the network using the plug-in.

10. The method of claim 9, wherein the rules associated with the process number identified in the process number field of the provided message comprise a set of rules for configuring the data service to establish a connection between the one or more mobile applications on the client on the mobile computer and the network based upon the set of rules.

11. The method of claim 10, wherein the set of rules comprises settings for the configuring of the data service to establish the connection between the one or more mobile applications on the client on the mobile computer and the network based upon the set of rules.

12. The method of claim 10, wherein:
    the set of rules defines a priority between a plurality of communication protocols; and the data service is configured to use a one of the plurality of communication protocols available to the mobile computer according to the priority defined by the set of rules included in the rules associated with the process number downloaded to the client on the mobile computer for use with a business application on the mobile computer.

13. The method of claim 10, wherein the set of rules defines a priority between a plurality of periods of time available to the mobile computer according to the priority defined by the set of rules included in the rules associated with the process number downloaded to the client on the mobile computer for use with the one or more mobile applications on the mobile computer.

14. The method of claim 7, wherein:
the message comprises a field for identifying a client on a mobile computer; and
the message is provided by a gateway to a server for identifying the client to which the server is to download a location of the process on the network associated with the process number for use by the one or more mobile applications on the mobile computer to establish a communication with the process.

15. A method, comprising:
providing a network gateway with a message comprising a source address field, a destination address field, and a field for identifying a process number for configuring a data service residing on a client on a mobile computer that provides network communications between one or more mobile applications on the mobile computer and a network;
selecting, with the process number, a plug-in program from a database stored on a non-transitory computer readable medium in the gateway, the database aggregating plug-in data for plug-in programs available from a plurality of servers; and
establishing a network connection between the client and one of the servers storing the selected plug-in within the server's non-transitory computer readable media;
wherein the process number identifies a plug-in to manage a data communication between the one or more mobile applications on the mobile computer and the plug-in; and
wherein the one or more mobile applications support data transfers of business or personal data.

16. The method of claim 15, wherein the management of the communication between the one or more mobile applications on the mobile computer and the network by the plug-in comprises interpreting the data received from the one or more mobile applications on the mobile computer.

17. The method of claim 15, wherein the management of the communication between the one or more mobile applications on the mobile computer and the network by the plug-in comprises retrieving new data from the network and handing the data back to a server for delivery back to the one or more mobile applications.

18. The method of claim 15, comprising associating with the process number a set of one or more predetermined rules for establishing communications between the one or more mobile applications on a mobile computer and the network using the plug-in.

19. The method of claim 18, comprising defining the set of one or more predetermined rules for establishing communications between the one or more mobile applications on a mobile computer and the network using the plug-in is by a network manager.

20. The method of claim 18, comprising downloading the set of one or more predetermined rules for establishing communications between the one or more mobile applications on a mobile computer and the network using the plug-in to the client on the mobile computer at the start of a communication between the one or more mobile applications on the mobile computer and the network.

* * * * *